(12) United States Patent
Kuroda et al.

(10) Patent No.: US 10,319,097 B2
(45) Date of Patent: Jun. 11, 2019

(54) IMAGE PROCESSING DEVICE, METHOD AND NON-TRANSITORY COMPUTER READABLE RECORDING MEDIUM FOR TRACKING A TARGET IN A MOTION PICTURE USING COLOR INFORMATION

(71) Applicant: Morpho, Inc., Tokyo (JP)

(72) Inventors: Yasuhiro Kuroda, Tokyo (JP); Akito Hyakutake, Tokyo (JP); Naruo Takizawa, Tokyo (JP); Ryo Ono, Tokyo (JP)

(73) Assignee: Morpho, Inc., Tokyo (JP)

( * ) Notice: Subject to any disclaimer, the term of this patent is extended or adjusted under 35 U.S.C. 154(b) by 73 days.

(21) Appl. No.: 15/331,923

(22) Filed: Oct. 24, 2016

(65) Prior Publication Data

US 2017/0116749 A1 Apr. 27, 2017

(30) Foreign Application Priority Data

Oct. 23, 2015 (JP) .................................. 2015-209412

(51) Int. Cl.
*G06T 7/20* (2017.01)
*G06T 7/246* (2017.01)

(52) U.S. Cl.
CPC ................ *G06T 7/20* (2013.01); *G06T 7/246* (2017.01); *G06T 2207/10016* (2013.01); *G06T 2207/10024* (2013.01)

(58) Field of Classification Search
None
See application file for complete search history.

(56) References Cited

U.S. PATENT DOCUMENTS 5,659,639 A * 8/1997 Mahoney ........... G06K 9/00442
345/440
8,626,236 B2 * 1/2014 Lindner .................. G10L 13/00
382/182

(Continued)

FOREIGN PATENT DOCUMENTS

CN 101965576 2/2011
CN 102694969 12/2014

(Continued)

OTHER PUBLICATIONS

"Office Action of Taiwan Counterpart Application," dated Sep. 22, 2017, p. 1-p. 14.

(Continued)

*Primary Examiner* — Soo Shin
(74) *Attorney, Agent, or Firm* — JCIPRNET

(57) ABSTRACT

An image processing device is provided. The image processing device includes: a tracking area setting section that sets a tracking area in a frame image of an original motion picture; a color information obtaining section that obtains color information of the tracking area set by the tracking area setting section; a tracking position estimating section that estimates a tracking position with reference to the tracking area with respect to each frame image of the original motion picture by using the color information obtained by the color information obtaining section; an output frame setting section that sets an output frame enclosing the tracking area set by the tracking area setting section and that updates the output frame based on the estimated tracking position; and a lock-on motion picture generating section that generates a motion picture that is based on the output frame.

17 Claims, 15 Drawing Sheets

(56) References Cited

U.S. PATENT DOCUMENTS

| | | | | |
|---|---|---|---|---|
| 2009/0180591 A1* | 7/2009 | Baumgart | ............... | A61B 6/463 378/98.12 |
| 2011/0019027 A1* | 1/2011 | Fujita | ........................ | G06T 7/20 348/222.1 |
| 2012/0243738 A1* | 9/2012 | Sakata | ............... | H04N 5/23219 382/103 |
| 2013/0222621 A1* | 8/2013 | Tokunaga | ........... | H04N 5/23293 348/208.1 |

FOREIGN PATENT DOCUMENTS

| | | |
|---|---|---|
| JP | 2007274543 | 10/2007 |
| JP | 2009212637 | 9/2009 |
| JP | 2012205037 | 10/2012 |
| TW | 201523459 | 6/2015 |
| WO | 2012127618 | 9/2012 |

OTHER PUBLICATIONS

"Office Action of Korea Counterpart Application," dated Nov. 21, 2017, p. 1-p. 8.

\* cited by examiner

FIG.2 (1)
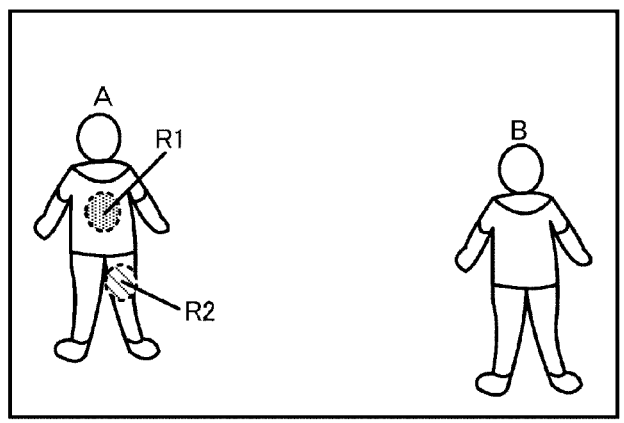
FIG.2 (2)
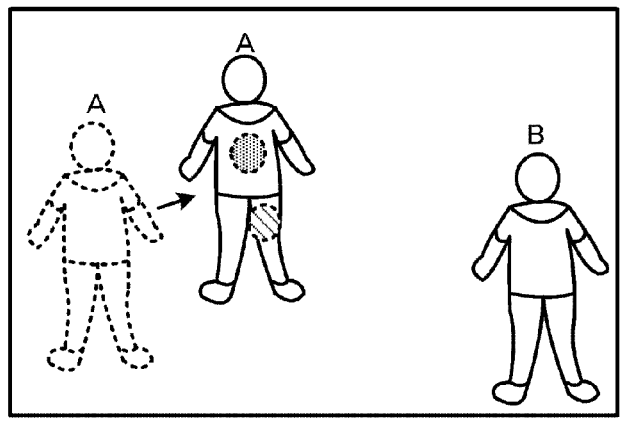

FIG.7 (1)
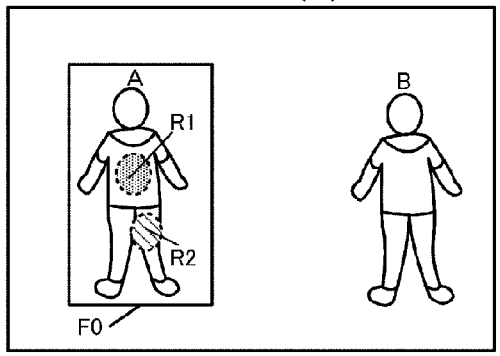
FIG.7 (2)
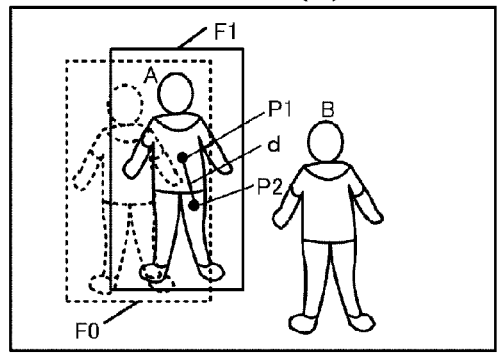
FIG.7 (3)
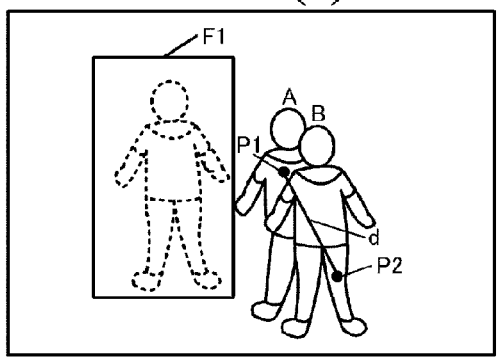
FIG.7 (4)
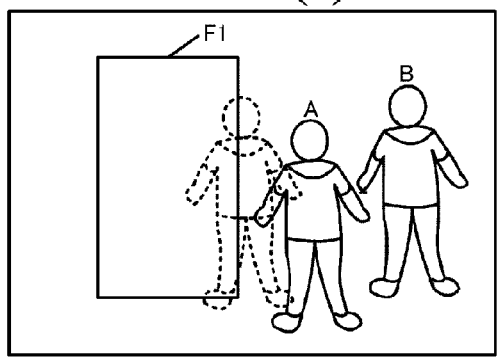
FIG.7 (5)
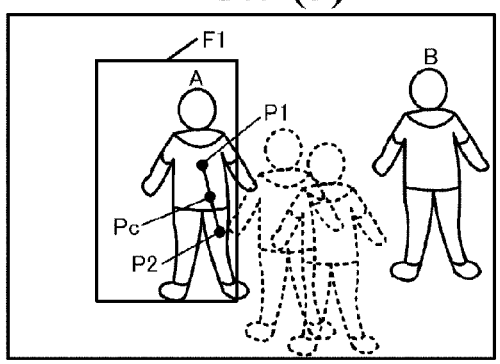
FIG.7 (6)
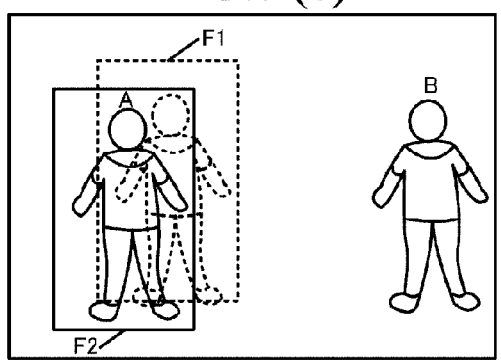

FIG.12 (1)
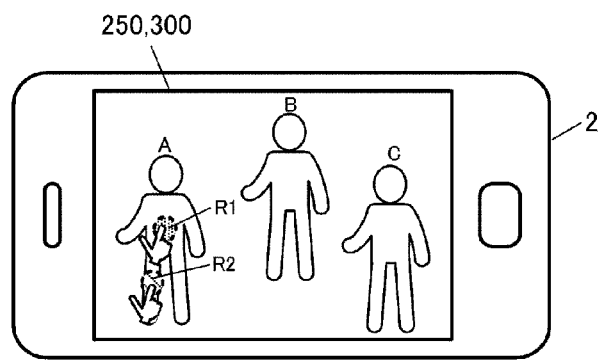
FIG.12 (2)
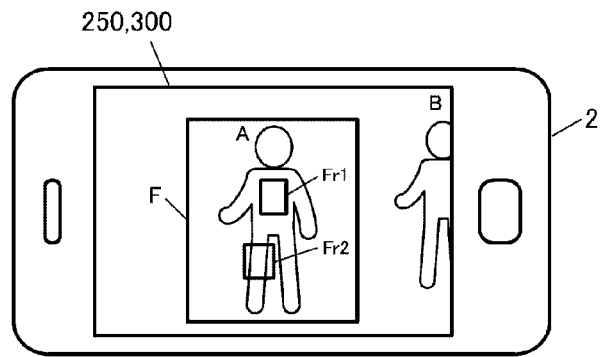

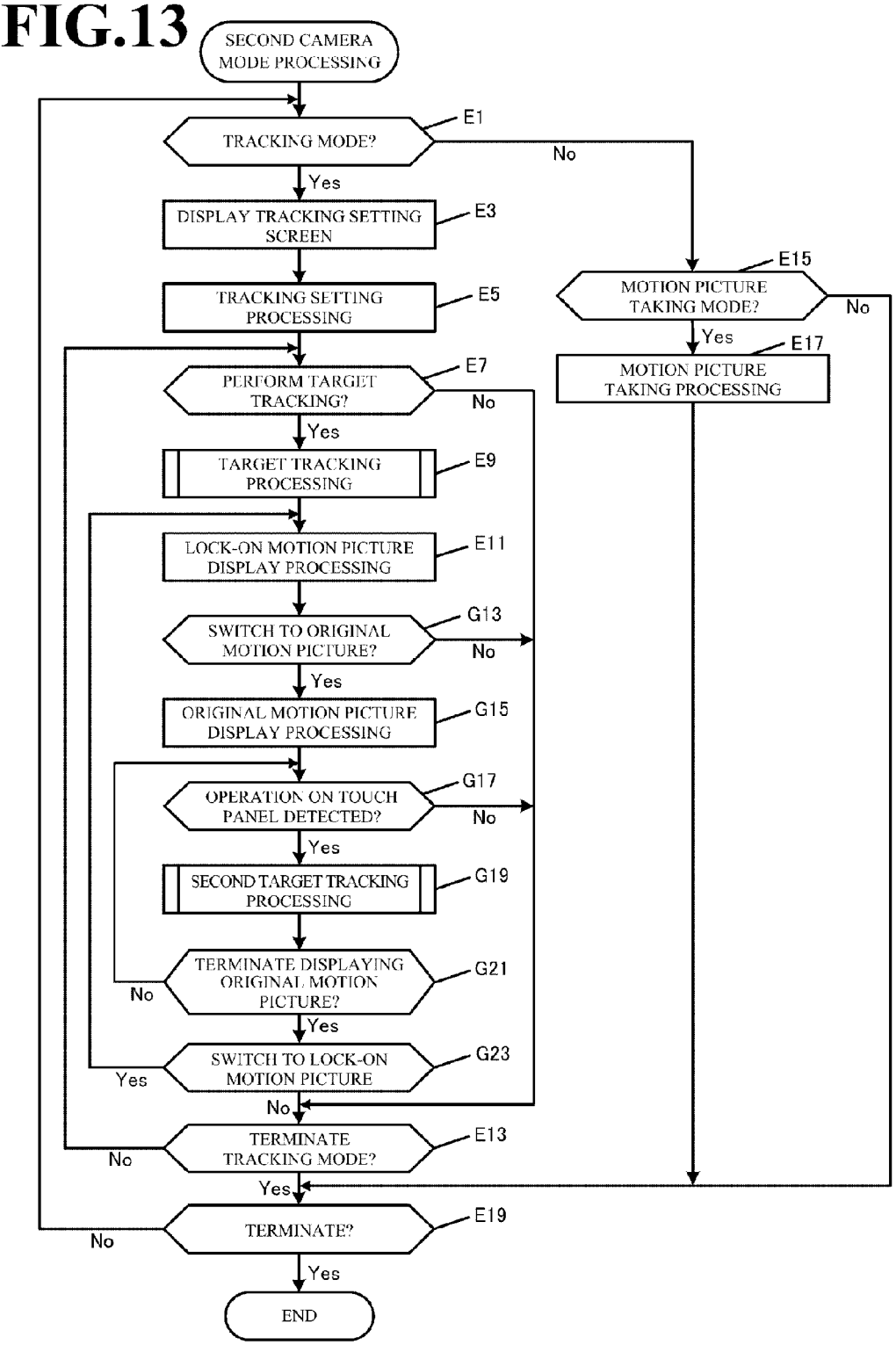

US 10,319,097 B2

IMAGE PROCESSING DEVICE, METHOD AND NON-TRANSITORY COMPUTER READABLE RECORDING MEDIUM FOR TRACKING A TARGET IN A MOTION PICTURE USING COLOR INFORMATION

CROSS-REFERENCE TO RELATED APPLICATIONS

This application claims the priority benefit of Japan Patent application serial no. 2015-209412, filed on Oct. 23, 2015. The entirety of the above-mentioned patent application is hereby incorporated by reference herein and made a part of this specification.

FIELD OF THE INVENTION

The present invention relates to an image processing device that tracks a target in a motion picture and the like.

DESCRIPTION OF RELATED ART

Image processing devices that track a target in a motion picture have been known in several arts (e.g. see Patent Document 1 to Patent Document 3)

CITATION LIST

Patent Literature

Patent Document 1: WO 2012/127618A,
Patent Document 2: US 2013/0222621A
Patent Document 3: JP 2012-205037A

SUMMARY OF INVENTION

While the above-described patent documents on image processing devices disclose tracking techniques (tracking algorithms) that track a target in a motion picture, a problem with the prior art is that usage of the result of tracking a target has not been taken into consideration.

The present invention has been made in view of the problem, and an object thereof is to propose a novel usage of a tracking result that is obtained by tracking a target in a motion picture.

In order to solve the above-described problem, the following means are employed. The reference signs used in the following description of embodiments and drawings are added for the purpose of reference. However, the components of the present invention are not limited to those represented by the reference signs.

A first invention is:
an image processing device (image processing device in FIG. 1), including:
a tracking area setting unit (tracking area setting section 11 in FIG. 1) configured to set a tracking area on a target in a frame image of an original motion picture (A3 in FIG. 4);
a color information obtaining unit (color information obtaining section 12 in FIG. 1) configured to obtain color, information of the tracking area set by the tracking area setting unit (A5 in FIG. 4);
a tracking position estimating unit (tracking position estimating section 14 in FIG. 1) configured to estimate a tracking position with reference to the tracking area with respect to each frame image of the original motion picture by using the color information obtained by the color information obtaining section (B3 in FIG. 5);

an output frame setting unit (output frame setting section 17 in FIG. 1) configured to set an output frame enclosing the tracking area set by the tracking area setting unit and to update the output frame based on the estimated tracking position (B19 in FIG. 5); and
a motion picture generating unit (lock-on motion picture generating section 18 in FIG. 1) configured to generate a motion picture that is based on the output frame updated by the output frame setting unit (A11 in FIG. 4).

Another invention may be:
an image processing method, including:
setting a tracking area on a target in a frame image of an original motion picture (A3 in FIG. 4);
obtaining color information of the set tracking area (A5 in FIG. 4);
estimating a tracking position with reference to the tracking area with respect to each frame of the original motion picture based on the obtained color information (B3 in FIG. 5);
setting an output frame enclosing the set tracking area and updating the output frame based on the estimated tracking position (B19 in FIG. 5); and
generating a motion picture that is based on the updated output frame (A11 in FIG. 4).

Yet another invention may be:
a non-transitory computer readable recording medium storing a program (target tracking program 811 in FIG. 9) that makes a computer (processor of a device) perform image processing comprising:
a tracking area setting step (A3 in FIG. 4) of setting a tracking area on a target in a frame image of an original motion picture;
a color information obtaining step (A5 in FIG. 4) of obtaining color information of the tracking area set in the tracking area setting step;
a tracking position estimating step (B3 in FIG. 5) of estimating a tracking position with reference to the tracking area with respect to each frame image of the original motion picture by using the color information obtained in the color information obtaining step;
an output frame setting step (B19 in FIG. 5) of setting an output frame enclosing the tracking area set in the tracking area setting step and updating the output frame based on the estimated tracking position; and
a motion picture generating step (A11 in FIG. 4) of generating a motion picture that is based on the output frame.

In the first invention and the like, a tracking position with reference to a tracking area is estimated with respect to each frame image of an original motion picture by using color information of the tracking area that is set on a target in a frame image of the original motion picture. Further, an output frame enclosing the set tracking area is set and is then updated based on the estimated tracking position as the tracking position is estimated. Then, a motion picture that is based on the updated output frame is generated from the original motion picture. This enables a result of tracking a target to be provided as a lock-on motion picture that addresses the target.

A second invention may be:
the image processing device according to the first invention,
wherein the tracking area includes a plurality of tracking areas, and the tracking area setting unit is configured to set the plurality of tracking areas on the target in the frame image of the original motion picture (A3 in FIG. 4);

the color information obtaining unit is configured to obtain the color information with respect to each of the plurality of tracking areas set by the tracking area setting unit (A5 in FIG. 4); and the tracking position includes a plurality of tracking positions, and the tracking position estimating unit is configured to estimate the plurality of tracking positions with reference to the respective plurality of tracking areas with respect to each frame image of the original motion picture based on the color information of the respective plurality of tracking areas obtained by the color information obtaining unit (B3 in FIG. 5).

In the second invention, a plurality of tracking areas are set on a target in a frame image of an original motion picture, and a plurality of tracking positions with reference to the respective plurality of tracking areas is estimated with respect to each frame image of the original motion picture based on the color information of the respective plurality of tracking areas. This enables tracking a target more reliably (robustly).

A third invention may be:

the image processing device according to the first invention, further including:

a tracking position adequacy determining unit (tracking position adequacy determining section 15 in FIG. 1) configured to make a determination as to whether the tracking position estimated by the tracking position estimating unit is adequate (B11 in FIG. 5); and a tracking position re-estimating unit (tracking position re-estimating section 16 in FIG. 1) configured to re-estimate the tracking position if the tracking position adequacy determining unit determines that the tracking position is inadequate (B23 in FIG. 5).

In the third invention, it is possible to determine whether the estimated tracking position is an adequate position. If it is determined to be an inadequate position, the tracking position is re-estimated. This enables obtaining an adequate tracking position.

A fourth invention may be:

the image processing device according to the third invention, wherein the tracking area includes a plurality of tracking areas, and the tracking area setting section is configured to set the plurality of tracking areas on a target in the frame image of the original motion picture (A3 in FIG. 4);

the color information obtaining unit is configured to obtain the color information with respect to each of the plurality of tracking areas set by the tracking area setting unit (A5 in FIG. 4);

the tracking position includes a plurality of tracking positions, and the tracking area estimating unit is configured to estimate the plurality of tracking positions with reference to the respective plurality of tracking areas with respect to each frame image of the original motion picture based on the color information of the respective plurality of tracking areas obtained by the color information obtaining unit (B3 in FIG. 5); and the tracking position adequacy determining unit is configured to make the determination based on the relative positional relationship between the plurality of tracking positions that are estimated by the tracking position estimating unit with reference to the respective plurality of tracking areas set by the tracking area setting unit (based on whether the distance between the estimated tracking positions satisfies the closeness condition).

In the fourth invention, the adequacy determination is made based on the relative positional relationship between the plurality of tracking positions that are estimated with reference to the respective plurality of tracking areas. This enables correctly determining the adequacy of the estimated tracking positions.

A fifth invention may be:

the image processing device according to a third invention, wherein the output area setting unit is configured to suspend updating the output frame when the tracking position re-estimating unit re-estimates the tracking position (B25 in FIG. 5).

In the fifth invention, if the re-estimated tracking position is inadequate, it is possible to prevent an output frame from being generated based on the inadequate tracking position. This enables preventing an object that is not relevant to the tracking target from being output.

A sixth invention may be:

the image processing device according to the fifth invention, wherein the tracking position estimating unit is configured to estimate the tracking position with respect to each frame of the original motion picture based on the tracking position re-estimated by the tracking position re-estimating unit (B23 to B25 to B21 to B3 in FIG. 5); and the output frame setting unit is configured to resume updating the output frame when the tracking position estimated by the tracking position estimating unit is included within a predetermined range based on the output frame (B5, Yes to B7, Yes to B9).

In the sixth invention, when the tracking position that is estimated based on the re-estimated tracking position is an adequate tracking position, the output frame is generated based on the adequate tracking position. This enables adequately outputting the tracking target. Further, when the tracking position that is estimated based on the re-estimated tracking position is an inadequate position, it is possible to prevent the output frame being generated based on the inadequate tracking position. This enables preventing an object that is not relevant to the tracking target from being output.

A seventh invention may be:

the image processing device according to the sixth invention, wherein the tracking position re-estimating unit is configured to re-estimate the tracking position with reference to the output frame at the time of the resumption of updating the output frame going back in time from the suspension of updating the output frame to the resumption of updating the output frame.

In the seventh invention, the tracking position is re-estimated with reference to the output frame at the time of the resumption of updating the output frame going back in time to the suspension of updating the output frame. This enables complementary estimating the tracking position during a period in which updating of the output frame is suspended.

The eighth invention may be:

the image processing device according to the first invention, wherein the target includes a plurality of targets, the tracking area includes a plurality of tracking areas, and the tracking area setting unit is configured to set the plurality of tracking areas on the plurality of targets in the frame image of the original motion picture; and the image processing device further comprises a priority setting unit (priority setting section of the image processing device 1, not shown in the drawings) configured to set priority of tracking among the plurality of targets; and the output frame setting unit is configured to set an output frame to be updated based on the priority set by the priority setting unit.

The eighth invention enables tracking a plurality of targets. Further, priority is set to one or some among the plurality of targets, and the output frame to be updated is determined based on the set priority. This enables generating a lock-on motion picture that addresses a high-priority target.

A ninth invention may be:

the image processing device (image processing device in FIG. 8) according to the first invention, further including:

a pattern information obtaining unit (pattern information obtaining section 13 in FIG. 8) configured to obtain pattern information of the tracking area set by the tracking area setting unit, wherein the tracking area estimating unit is configured to estimate the tracking position with respect to each frame of the original motion picture further based on the pattern information obtained by the pattern information obtaining unit.

The ninth invention enables tracking a target further based on the shape of the target by using the pattern information of the tracking area for estimating the tracking position.

The tenth invention may be:

the image processing device according to the first invention, further including:

an output frame position correcting unit (output position correcting section of the image processing device 1, not shown in the drawings) configured to correct a position of the output frame based on a displacement of the position of the output frame updated by the output frame setting unit, wherein the motion picture generating unit is configured to generate the motion picture that is based on the output frame corrected by the output frame position correcting unit.

In the tenth invention, the position of the output frame is corrected based on the displacement of the updated output frame. This enables preventing jiggling of the generated lock-on motion picture.

An eleventh invention may be:

an electronic device, including:

the image processing device (image processing device 1 in FIG. 1 or FIG. 8) according to the first invention;

a display unit (display section 300 in FIG. 9) integrally formed with a touch panel (touch panel 250 in FIG. 9); and a display control unit (display control section 190 in FIG. 9) configured to control the display unit;

wherein the tracking area setting unit is configured to set the tracking area based on a user operation performed on the touch panel (F5 in FIG. 11, Yes to F7 to F9), and the display control unit includes a motion picture display control unit configured to display the motion picture generated by the motion picture generating unit on the display unit (E11 in FIG. 10).

The eleventh invention enables tracking a target based on a tracking area that is set based on a user operation. Further, it enables the user to check the lock-on motion picture that addresses the target.

A twelfth invention may be:

the electronic device according to the eleventh invention, wherein the display control unit includes a tracking area display control unit configured to overlay the tracking area set by the tracking area setting unit on the motion picture in an identifiable displaying manner (a tracking area frame enclosing the tracking area being displayed in a certain color) (E11 in FIG. 10).

The twelfth invention enables the user to check the set tracking area in the lock-on motion picture.

The thirteenth invention may be:

an electronic device, including:

the image processing device (image processing device 1 in FIG. 1 or FIG. 8) according to the first invention;

a display unit (display section 300 in FIG. 9) integrally formed with a touch panel (touch panel 250 in FIG. 9); and a display control unit (display control section 190 in FIG. 9) configured to control the display unit, wherein the tracking area includes a plurality of tracking areas, and the tracking area setting unit is configured to set the plurality of setting areas on the target in the frame image of the original motion picture based on a user operation performed on a touch panel (A3 in FIG. 4), the color information obtaining unit is configured to obtain the color information with respect to each of the plurality of tracking areas set by the tracking area setting unit (A5 in FIG. 4), the tracking position comprises a plurality of tracking positions, and the tracking position estimating unit is configured to estimate the plurality of tracking positions with reference to the respective plurality of tracking areas with respect to each frame image of the original motion picture based on the color information of the respective plurality of tracking areas obtained by the color information obtaining unit (B3 in FIG. 5), and the display control unit comprises a motion picture display control unit configured to display the motion picture generated by the motion picture generating unit on the display unit (E11 in FIG. 10).

The thirteenth invention enables tracking a target based on a plurality of tracking areas that is set based on a user operation. Further, it enables the user to check a lock-on motion picture that addresses the target.

A fourteenth invention may be:

the electronic device according to the thirteenth invention, wherein the display control unit includes a tracking area display control unit configured to overlay the plurality of tracking areas set by the tracking area setting unit on the motion picture in such an identifiable displaying manner that distinguishes the plurality of tracking areas from each other (tracking areas enclosing the respective tracking areas being displayed in a certain color) (display control section 190 in FIG. 9).

The fourteenth invention enables the user to check a set plurality of tracking areas in a lock-on motion picture.

A fifteenth invention may be:

the electronic device according to the eleventh invention, wherein the display control unit includes a first output frame display control unit configured to overlay the output frame updated by the output frame setting unit on the motion picture in an identifiable displaying manner (the frame lines being displayed in a certain color) (display control section 190 in FIG. 9).

The fifteenth invention enables the user to check an updated output frame in a lock-on motion picture.

A sixteenth invention may be:

the electronic device according to the fifteenth invention, wherein the motion picture display control unit is configured to display the motion picture that shows an enlarged predetermined area including the output frame on the display unit, and the first output frame display control unit is configured to overlay the output frame on the motion picture, in which a size of the output frame is adjusted corresponding to the enlarged predetermined area.

The sixteenth invention enables the user to view a lock-on motion picture that shows an enlarged predetermined area (output target area) including an output frame on the display unit. Further, it enables overlaying the output frame on a lock-on motion picture in which the size of the output frame is adjusted corresponding to the enlarged predetermined area.

A seventeenth invention may be:
the electronic device according to the eleventh invention, wherein the display control unit includes:
an original motion picture display control unit (display control section 190 in FIG. 9) configured to display the original motion picture on the display unit; and
a second output frame display control unit (display control unit 190 in FIG. 9) configured to overlay the output frame updated by the output frame setting unit on the original motion picture in an identifiable displaying manner (frame line of the output frame being displayed in a certain color).

The seventeenth invention enables the user to check an updated output frame in an original motion picture.

An eighteenth invention may be:
the electronic device according to the seventeenth invention, further including:
a moving operation determining unit (processing section 100 in FIG. 9) configured to make a determination as to whether a moving operation for moving the output frame currently overlaid on the original motion picture is performed through a user operation on the touch panel (H1 in FIG. 14); and
an object detecting unit (processing section 100 in FIG. 9) configured to detect an object present in the output frame if the moving operation determining unit determines that the moving operation of the output frame is performed (H5 in FIG. 14),
wherein the color information obtaining unit is configured to obtain color information of the object detected by the object detecting unit (H9 in FIG. 14), and
the tracking position estimating unit is configured to set an area of the object detected by the object detecting unit as the tracking area and to estimate the tracking position with respect to each frame of the original motion picture (H11 in FIG. 14).

The eighteenth invention enables moving an output frame according to the user moving operation, detecting an object present in the output frame and tracking a target based on the color information thereof.

BRIEF DESCRIPTION OF DRAWINGS

FIG. 2 (1) and FIG. 2 (2) are explanatory views of tracking area settings.

FIG. 7 (1) to FIG. 7 (6) are explanatory views of an output frame.

FIG. 12 (1) and FIG. 12 (2) illustrate an example of display screens of a smartphone.

FIG. 13 is a flowchart of second camera mode processing, illustrating an example of the flow thereof.

DESCRIPTION OF THE EMBODIMENTS

Hereinafter, a preferred embodiment of the present invention will be described with reference to the drawings. In the following description, the same reference signs denote the same components, and the repetitive description thereof may be omitted. The drawings do not necessarily correspond to the description with respect to their dimensions. It should be understood that the embodiments of the present invention are not limited to the following embodiment.

1. Image Processing Device

An image processing device of the embodiment tracks a target in a motion picture. In the embodiment, it is preferred that the motion picture in which the target is tracked is captured from a fixed point (fixed-point imaging). This is because the image processing device according to the embodiment tracks a target mainly by using color information, and a change in color of the target due to hand-shaking blur, lighting or the like causes a decrease of the tracking accuracy.

However, the technique of the embodiment can be used for tracking a target in motion pictures other than motion pictures captured from a fixed point. By making an adjustment of the white balance to address a change of brightness of a motion picture and by using image stabilization or the like to address hand shaking blur of a motion picture, a target can be tracked practically at the same performance as in a motion picture captured from a fixed point.

For example, the image processing device according to the embodiment can be installed in mobile devices with limited resources, such as mobile phones including smartphones, digital cameras, tablet terminals and PDAs (personal digital assistants). In addition to such devices, the image processing device can be installed in standard computer systems and the like.

1-1. Functional Configuration

Figure 1:
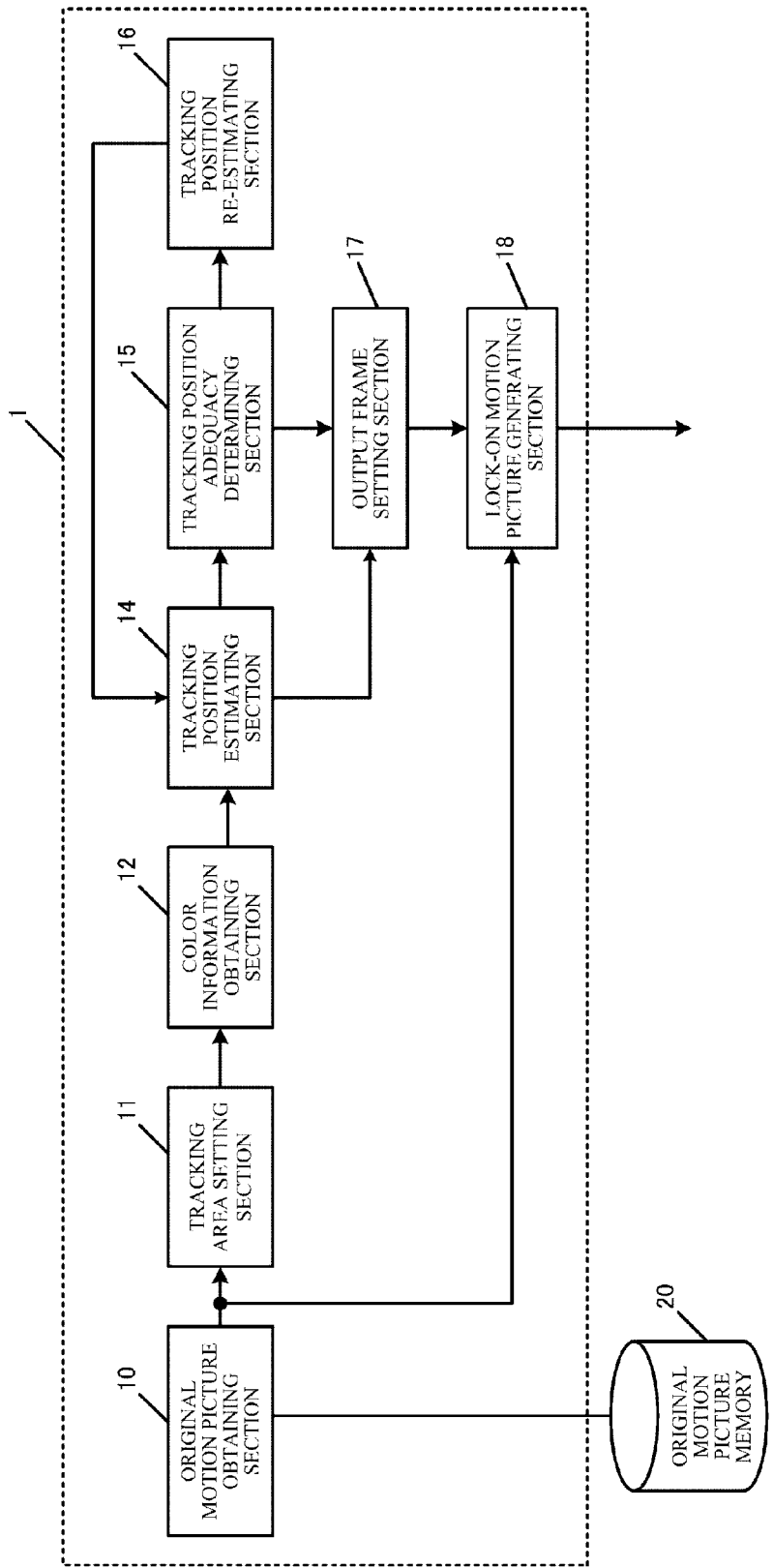
FIG. 1 illustrates an example of the functional configuration of an image processing device.

FIG. 1 is a block diagram of an example of the functional configuration of an image processing device 1 according to the embodiment.

The image processing device 1 includes an original motion picture obtaining section 10, a tracking area setting section 11, a color information obtaining section 12, a tracking position estimating section 14, a tracking position adequacy determining section 15, a tracking position re-estimating section 16, an output frame setting section 17 and a lock-on motion picture generating section 18. They are functional sections (functional blocks) of the processing section (processing device) of the image processing device 1, and the processing section is constituted by processors such as a CPU and a DSP, an integrated circuit such as an ASIC and the like.

The original motion picture obtaining section 10 obtains a motion picture (the data of a motion picture) from original motion pictures stored in an original motion picture memory 20. The original motion picture is composed of a plurality of frame images. As used herein, a motion picture in which a target is tracked is referred to as an original motion picture in order to distinguish it from a lock-on motion picture described below.

The tracking area setting section 11 sets a tracking area on a target in the frame images of the original motion picture that is obtained by the original motion picture obtaining section 10. The tracking area set by the tracking area setting section 11 may be composed of either a single area or two or more areas. In the embodiment, when two tracking areas are set on one target, the two tracking areas are referred to respectively as a "first tracking area" and a "second tracking area".

FIG. 2 (1) and FIG. 2 (2) illustrate the principle of setting the tracking area.

FIG. 2 (1) illustrates an example of a frame image of the original motion picture, in which two persons, A and B, are shown. When Person A is set as the target to be tracked, for example, two tracking areas are set respectively on the upper body and the lower body of Person A. In the embodiment, the target is tracked mainly by using the color information of the target. The reason two tracking areas are set on the upper body and the lower body of Person A is that a shirt, which is worn on the upper body, often has a different color from pants, which is worn on the lower body. For example, a first tracking area R1 is set on a part of the shirt in the upper body, and a second tracking area R2 is set on a part of the pants in the lower body.

Suppose that Person A and Person B play a sport together, and a motion picture thereof is captured by means of an electronic device such as a smartphone. In order to check the movement of Person A playing the sport, a user may sometimes want to watch a close-up motion picture of Person A. To achieve this, in the embodiment, Person A is tracked as the target based on the color information of the first tracking area R1 and the second tracking are R2, which are set as above, as illustrated in FIG. 2 (1). Specifically, when Person A moves as illustrated in FIG. 2 (2), Person A is tracked by estimating the tracking positions with reference to the first tracking area R1 and the second tracking area R2, which are set as illustrated in FIG. 2 (1).

The color information obtaining section 12 obtains the color information of the pixels included in the tracking areas that is set by the tracking area setting section 11. Specifically, the color information obtaining section 12 calculates the statistical frequency of the occurrence of the colors in the tracking area that is set by the tracking area setting section 11.

In the embodiment, each pixel value is represented by the HSV color space (H: hue, S: saturation, V: value) in which the values of the H, S and V components are within an 8-bit range of from 0 to 255. The color information obtaining section 12 generates a histogram of the frequency of occurrence in the tracking area with respect to each of the H, S and V components of the pixels included in the tracking area in a certain frame image. Then, based on the generated histogram and the pixel values (H, S, V) of the pixels in a predetermined area around the tracking area (hereinafter referred to as a "neighboring area") in another frame image, the color information obtaining section 12 calculates the probability distribution that shows the coordinates at which there is a high probability of the same color as the tracking area being present in another frame image. For example, another frame image may be the next frame image that follows after the certain frame image.

The probability distribution is calculated in the pixels included in the neighboring area of the tracking area for the following two reasons:

(1) To find an area having the same color as the tracking area at a position as close as possible to the tracking area;

(2) To reduce the amount of data required for the tracking processing.

Figure 3:
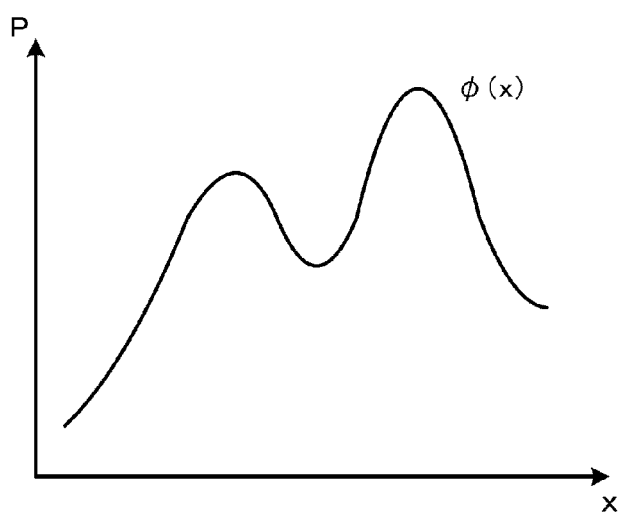
FIG. 3 is an explanatory view of probability distribution used in tracking processing.

FIG. 3 illustrates an example of the probability distribution that is calculated by the color information obtaining section 12. For ease of description, the figure shows a one-dimensional probability distribution.

The graph is a probability distribution $\varphi(x)$ in which the horizontal axis represents the random variable x and the vertical axis represents the probability P. For example, the random variable x corresponds to the x coordinate in the horizontal direction in a frame image. The probability distribution $\varphi(x)$ is a probability distribution function that shows the x coordinate at which there is a high probability that the same color as the tracking area is present. That is, it shows that the probability of the same color as the tracking area being present is the highest at the x coordinate of the highest vertex of the curve. However, since an image is two-dimensional, the actual probability distribution $\varphi(x, y)$ has components of two-dimensional coordinates (x, y) in a frame image.

In the embodiment, the color information obtaining section 12 is configured to be capable of calculating the probability distribution $\varphi(x, y)$ based on either of two color models that are respectively referred to as a single-color model and a multi-color model. The single-color model uses a color with the highest frequency of occurrence in the color distribution in the tracking area as the color information for the tracking. That is, the single-color model uses color information on a single color to track the target. In the embodiment, however, the H, S and V components of the color used for the tracking in the single-color model are allowed to vary within a certain range, and the color having the H, S and V components within the certain range is used for the tracking.

In contrast, the multi-color model uses the color distribution of all pixels in a specific area (e.g. a rectangular area) of a certain size in the tracking area as the color information for the tracking. That is, the multi-color model uses the color information of a specific area including plural colors to track the target.

In the single-color model of the embodiment, among the colors of a target, a single color is used for the tracking. Since the color used for the tracking is allowed to have H, S and V components that vary within the certain range, the model can be tolerant to a change in lighting. Allowing the H, S and V components to be within the certain range, the influence of light is reduced. Accordingly, it can be said that the single-color model of the embodiment is suitable for tracking a target in a motion picture that is captured outdoors. Among the H, S and V components, the H (hue) component, which represents a type of color, is particularly susceptible to light.

In contrast, the multi-color model of the embodiment is suitable for a case in which a target is shown in a combination of plural colors since the color information on plural colors of a target is used for the tracking. An example of such cases is that the color of a cloth of a target person is not a single color but a combination of plural colors. The multi-color model has the characteristics of being more susceptible to light compared to the single-color model. Accordingly, it can be said that the multi-color model of the embodiment is suitable for tracking a target in a motion picture that is captured indoors.

Therefore, in tracking a target, it is suitable to switch the color model between the single-color model and the multi-color model according to the environment in which the motion picture is captured. In this case, the color information obtaining section 12 may be configured to automatically select the single-color model or the multi-color model according to the deviation of the color distribution and the variation of the brightness in the tracking area of the target. Alternatively, the user may select the single-color model or the multi-color model by an operation on an operation section (not shown) based on the image-capturing environment and the color in the tracking area of a target. Alternatively, the color information obtaining section 12 may select a recommended model according to the deviation of the color distribution and the variation of the brightness in the tracking area of a target and display it on a display screen so that the user who checks it can select the single-color model or the multi-color model. Alternatively, a menu screen may be displayed on the display screen so that the user selects either an indoor or outdoor image-capturing environment and either a single color or plural colors for the color(s) in the tracking area of a target, and the single-color model or the multi-color model may be selected according to the user selection. The display screen and the operation section for a user operation that are used for the above purposes may be internally provided as a part of the image processing device 1 of FIG. 1 or externally provided and connected to the image processing device 1 via a wired or wireless communicating means.

The tracking position estimating section 14 estimates the tracking position with reference to the tracking area by the Mean-Shift method from the probability distribution $\varphi(x, y)$ that is calculated by the color information obtaining section 12. Further, the tracking position estimating section 14 estimates the tracking position with reference to the tracking area from the tracking position that is re-estimated by the tracking position re-estimating section 16. The tracking position estimated by the tracking position estimating section 14 is referred to as an "estimated tracking position". The Mean-Shift method is known in the art per se. For example, WO 2012/127618A, which is a prior application by the present applicant, discloses a tracking technique of a target by the Mean-Shift method. Therefore, a detailed description thereof is omitted here.

To describe it briefly, in the single-color model, a pixel having the same color as the color (single color) for the tracking is searched in a neighboring area of the latest (previous) estimated tracking position in a target frame image. That is, the HSV components of the color for the tracking are compared with the HSV components of each pixel included in the neighboring area, and the likelihood of each pixel is calculated based on the result of the comparison. Then, the position of a pixel having high likelihood, for example, the highest likelihood or a higher likelihood than a predetermined threshold is determined as the estimated tracking position.

In the multi-color model, the color distribution in the HSV color space for the tracking is considered as the probability distribution of colors in the tracking area, and the value in probability distribution is obtained with respect to the HSV components of each pixel in the neighboring area, so that the likelihood of each pixel is calculated. Then, the position of a pixel having high likelihood, for example, the highest likelihood or a higher likelihood than a predetermined threshold is determined as the estimated tracking position.

The tracking position adequacy determining section 15 makes a determination as to whether the estimated tracking position determined by the tracking position estimating section 14 is adequate (whether the estimated tracking position is an adequate position). Specifically, the reliability of a tracking position with reference to the first tracking area (hereinafter referred to as a "first estimated tracking position") and the reliability of a tracking position with reference to the second tracking area (hereinafter referred to as a "second estimated tracking position") are calculated using the likelihood calculated as described above.

The reliability of the estimated tracking positions may be the likelihood of the estimated tracking positions itself or a combination of the likelihood and an additional index value such as the color variety information of the tracking area. Then, the tracking position adequacy determining section 15 makes a determination as to whether the estimated tracking position is adequate based on the reliability of the first estimated tracking position and the reliability of the second estimated tracking position. Further, the tracking position adequacy determining section 15 makes a determination as to whether the estimated tracking position is adequate based on the relative positional relationship between the first estimated tracking position and the second estimated tracking position.

The tracking position re-estimating section 16 re-estimates the tracking position when the tracking position adequacy determining section 15 determines that the estimated tracking position is inadequate.

The output frame setting section 17 sets an output frame that includes the tracking area set by the tracking area setting section 11. It is preferred that the output frame has a predetermined size that can include the tracking area and the target. Further, the output frame setting section 17 updates the output frame including the tracking area based on the tracking position estimated by the tracking position estimating section 14. As used herein, the output frame refers to a sub-frame that is extracted from the captured motion picture so as to contain the target as its main portion and displayed over the frame image, which can also be referred to as an output area. The output frame may also be referred to as a tracking frame or a target frame based on the function thereof.

The lock-on motion picture generating section 18 generates a motion picture (hereinafter referred to as a "lock-on motion picture") that addresses the output frame updated by the output frame setting section 17 from the original motion picture stored in the original motion picture memory 20. That is, the lock-on motion picture is a motion picture that is generated based on the output frame as a separate motion picture that is different from the original motion picture. Since the lock-on motion picture is a motion picture that focuses on the target frame, it can also be referred to as an output motion picture, a target motion picture or a tracking motion picture.

1-2. Flow of Processing

Figure 4:
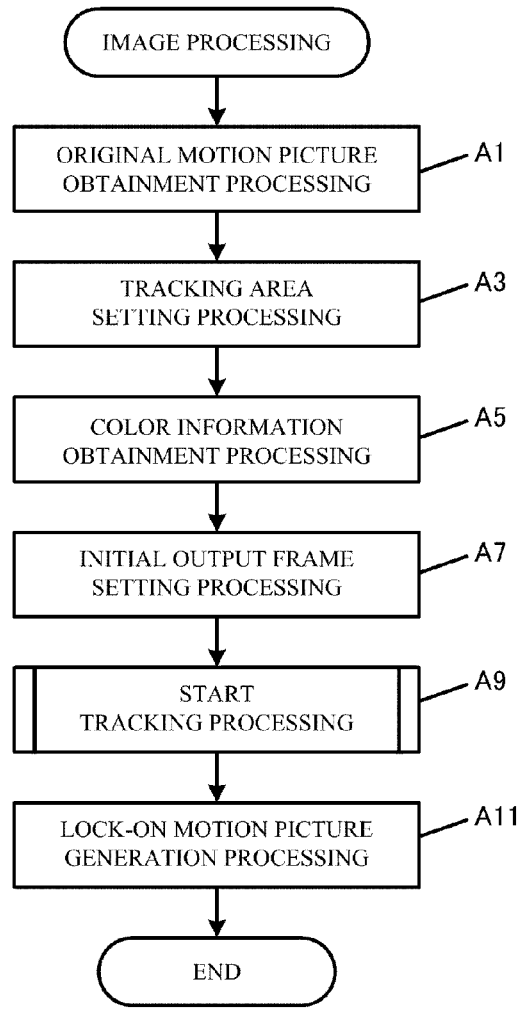
FIG. 4 is a flowchart of image processing, illustrating an example of the flow thereof

FIG. 4 is a flowchart of the image processing performed by the image processing device 1, illustrating an example of the flow thereof.

First, the original motion picture obtaining section 10 performs original motion picture obtainment processing (A1). Specifically, the original motion picture obtaining section 10 retrieves one motion picture from a plurality of original motion pictures stored in the original motion picture memory 20. Alternatively, a motion picture that is input from an input section (not shown) in real time and displayed on a display section (not shown) in real time (hereinafter referred to as a real-time motion picture) may be subjected to the following processing.

Then, the tracking area setting section 11 performs tracking area setting processing (A3). Specifically, the tracking area setting section 11 sets two tracking areas of the first tracking area and the second tracking area in a frame image from which the tracking of a target is started among the frame images of the motion picture retrieved in A1.

Specifically, it is preferred that in response to a user input of setting a tracking area during playback of a motion picture, the tracking area setting section 11 pauses the playback and sets the current frame image as a still frame image in which the tracking area of the target is set and from which the tracking processing starts.

In the case of a real-time motion picture, the continuously input real-time motion picture is stored in the original motion picture memory 20 while the tracking area of a target is being set on the still frame image. After the tracking area is set, the still frame image returns to the real-time motion picture. In this step, it is preferred that the tracking processing is performed on the real-time motion picture that was stored in the motion picture memory 20 while the still frame image was displayed, so that the tracking processing catches up with the real-time display. It is also preferred that the period of time for displaying the still frame image is set up to 5 seconds, for example, according to the capacity of the original image memory 20, and after the elapse of the set period of time, the tracking area setting is cancelled and the display returns to showing the real-time motion picture.

It is preferred that the tracking area is set so that the first tracking area and the second tracking area have different colors from each other. For this reason, it is useful to impart the following display function and guidance function. As the display function, after the user sets the first tracking area, the tracking area setting section 11 displays the color information of the first tracking area on the display screen (not shown). Then, the user sets the second tracking area referring to the displayed color information of the first tracking area. The color information thus displayed is a single color in the single-color mode or a plurality of colors in the multi-color mode, which is displayed, for example, in the form of textural information. Alternatively, when the color information is blue, for example, a blue sub-window screen may be displayed on the display screen so that the user can understand it at a glance. Further, after the second tracking area is set, an additional step is performed that involves displaying both the color information of the first tracking area and the color information of the second tracking area and asking the user to check whether the combination of the first and second tracking area is adequate. If the user determines that the combination is adequate, the tracking area setting ends, and the process proceeds to the next processing. If the user determines that the combination is inadequate, the tracking areas are set again.

As the guidance function, after the user sets the first tracking area, a notification is made that prompts the user to set an area having a different color from the first tracking area as the second tracking area. Further, after the user sets the first and second tracking areas, the tracking area setting section 11 makes a determination as to whether the combination of the first and second tracking areas is adequate. If inadequate, a notification is made that prompts the user to set the tracking areas again.

When the first and second tracking areas are set on a same tracking target as illustrated in FIG. 2 (1), it is obvious that the two tracking areas are close to each other. Therefore, after the user sets the first tracking area, the tracking area setting section 11 may restrict the region in which the second tracking area is settable to the vicinity of the first tracking area. When the user sets the second tracking area outside the settable region of the second tracking area, the tracking area setting section 11 makes a notification of a tracking area setting error. Further, a figure such as a rectangle that represents the settable region may be overlaid on the still frame image, and a notification may be made that prompts the user to adequately set the second tracking area. In this way, it is possible to prevent the user from erroneously setting an inadequate tracking area.

When the first and second tracking areas are set on a same tracking target, the tracking area setting section 11 may automatically set the second tracking area in the vicinity of the first tracking area after the user sets the first tracking area. In this case, it is preferred that an area that has color information different (for example, different enough to distinguish the two tracking processings) from the first tracking area is set as the second tracking area.

With regard to whether the user sets both the first and second tracking areas or the user sets the first tracking area while the tracking area setting section 11 sets the second tracking area, a menu may be displayed on the display screen that prompts the user to select one of the two setting methods.

The above-described tracking area setting may be performed after a target is detected by human detection, face detection or the like known in the art. When one target is detected, the tracking area setting section 11 automatically sets the target as the tracking target. When a plurality of targets are detected, figures such as rectangles that respectively surround the targets (hereinafter referred to as detected target frames) are overlaid on the still frame image so that the user can select a desired target as the tracking target.

It is preferred that the above-described target detection is automatically performed right after setting the still frame image. Alternatively, while a motion picture is being played back, the above-described target detection and the display of the detected target frame may be automatically performed at predetermined intervals, e.g. every 5 seconds after the user inputs a request to set the tracking area. This overlay of the target frame on the motion picture at the predetermined intervals enables notifying the user of the position of a tracking area candidate in the motion picture.

By using the result of the target detection, the setting of the tracking area and the selection of the single-color model or the multi-color model may be automatically performed according to the type of target. For example, when the detected target is a person, the tracking area setting section 11 automatically sets the two tracking areas of the first tracking area on the upper body of the person and the second tracking area on the lower body of the person. Further, when the detected target is a person, the tracking area setting section 11 selects the multi-color model and sets two tracking areas. When the detected target is an automobile, the tracking area setting section 11 selects the single-color model and sets one tracking area. It is preferred that the user is able to change the settings automatically selected as above before the image processing device 1 performs the tracking processing.

Thereafter, the color information obtaining section 12 performs color information obtainment processing (A5).

Specifically, with respect to each of the two tracking areas of the first and second tracking areas set in A3, the color information obtaining section 12 calculates the probability distribution φ (x, y) from the H, S and V components and the coordinates of the pixels included in the tracking areas based on the single-color model or the multi-color model.

Then, the output frame setting section 17 performs initial output frame setting processing (A7). Specifically, for example, an output frame is set which has a predetermined size and includes the first and second tracking areas set in A3. It is preferred that the output frame has a size that includes the first and second tracking area and the target. It is also preferred that the first and second tracking areas are included to be located at around the center area of the output frame. To achieve this, the output frame setting section 17 may set the initial output frame so that the coordinates of the midpoint of the line segment connecting the centers of the first and second tracking areas correspond to the center of the output frame of a predetermined size or fall within a predetermined range from the center of the output frame. Thereafter, the tracking processing starts (A9).

Figure 5:
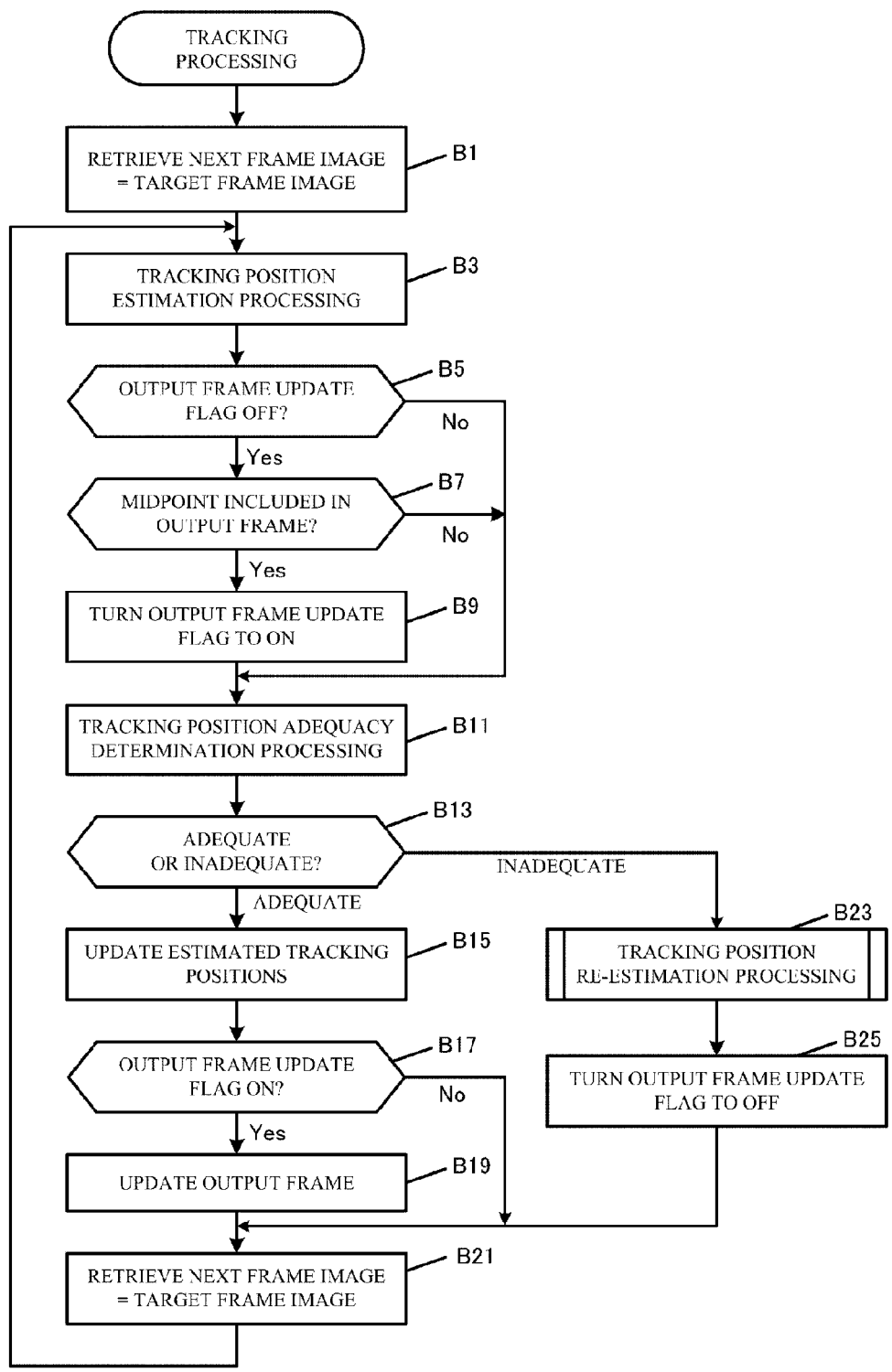
FIG. 5 is a flowchart of tracking processing, illustrating an example of the flow thereof.

FIG. 5 is a flowchart of the tracking processing, illustrating an example of the flow thereof.

First, the image processing device 1 retrieves the frame image next to the current frame image (the data of the next frame image) and sets the retrieved frame image as the target frame image.

Then, the tracking position estimating section 14 performs tracking position estimation processing (B3). Specifically, with respect to each of the first and second tracking areas, the tracking position estimating section 14 estimates the tracking position in the target frame image retrieved in B1 based on the probability distribution φ (x, y) by the Mean-Shift method.

Thereafter, the output frame setting section 17 makes a determination as to whether an output frame update flag is "OFF" (B5). In the initial setting, the output frame update flag, which is the flag that shows whether to update the output frame, is "ON", and it is turned to "OFF" when the tracking position re-estimation processing described below is performed.

If it is determined that the output frame update flag is "OFF" (B5, Yes), the output frame setting section 17 calculates the position of the midpoint between the first estimated tracking position and the second estimated tracking position determined in the tracking position estimation processing (hereinafter referred to as the "midpoint position") and makes a determination as to whether the calculated midpoint position is included in the output frame (B7). Here, the determination may be made as to whether the calculated midpoint position is included within a predetermined range based on the output frame, for example, within a predetermined distance from the output frame or within a predetermine distance from the center of the output frame, that is, the midpoint position may be outside of the output frame but close enough to resume the update.

If it is determined that the calculated midpoint position is included in the output frame (B7, Yes), the output frame setting section 17 turns the output frame update flag to "ON" (B9). If it is determined in B5 that the output frame update flag is not "OFF" (B5, No), or if it is determined in B7 that the midpoint position is not included in the output frame (B7, No), the process proceeds to tracking position adequacy determination processing (B11).

Thereafter, the tracking position adequacy determining section 15 performs the tracking position adequacy determination processing (B11). Specifically, the tracking position adequacy determining section 15 makes a determination as to whether a first adequacy determining condition is satisfied, in which the first adequacy determining condition is a high reliability condition in which the above-described reliability of the first estimated tracking position and the reliability of the second estimated tracking position are equal to or greater than (or only greater than) respective predetermined reliability thresholds. Further, the tracking position adequacy determining section 15 makes a determination as to whether a second adequacy determining condition is satisfied, in which the second adequacy determining condition is a closeness condition in which the distance between the first estimated tracking position and the second estimated tracking position is equal to or less than (or only less than) a predetermined distance threshold. If both the first adequacy determining condition and the second adequacy determining condition are satisfied, the tracking position adequacy determining section 15 determines that the estimated tracking positions are adequate. If at least one of the adequacy determining conditions is not satisfied, the tracking position adequacy determining section 15 determines that the estimated tracking positions is inadequate.

As described with reference to FIG. 2 (1) and FIG. 2 (2), for example, when two tracking areas are set respectively on the upper body and the lower body of a person, the relative positional relationship between the upper body and the lower body does not change even when the person moves. Accordingly, the relative positional relationship between the first tracking area and the second tracking area is considered not to change. Based on this, a determination is made as to whether the distance between the first estimated tracking position and the second estimated tracking position satisfies the closeness condition as the second adequacy determining condition.

Instead of the two adequacy determining conditions of the first and second adequacy determining conditions, the determination of whether the estimated tracking positions are adequate may be made solely on the basis of either one of the adequacy determining conditions. For example, the determination of whether the estimated tracking positions is adequate may be made solely on the basis of the second adequacy determining condition.

Alternatively, the determination of the adequacy may be made on the basis of whether the total value of the reliability of the first estimated tracking position and the reliability of the second estimated tracking position is equal to or greater than a predetermined threshold, which serves as the first adequacy determining condition. It is also effective to give weighting to the reliabilities. For example, it is preferred that the reliability of the first tracking position is has a greater weighting than the reliability of the second tracking position, and that the determination of the adequacy is made on the basis of whether the total value of the two reliabilities is equal to or greater than a threshold. To set the weights, a tracking position whose reliability has a greater weighting than the other may be selected from the first and second tracking positions according to a user operation, or the tracking position adequacy determining section 15 may automatically set the weights. When the weights are automatically set, it may be previously defined that the first tracking area to be set on the upper body is more important than the second tracking area to be set on the lower body. Then, when the target is a person, the tracking position adequacy determining section 15 gives the reliability of the first tracking position greater weighting than the reliability of the second tracking position based on the predefined information. This configuration enables making a comprehensive determination of whether the tracking positions are adequate, in which the importance of the first and second estimated tracking positions is also considered.

If it is determined in the tracking position adequacy determining processing that the estimated tracking positions are adequate (B13, adequate), the tracking position estimating section 14 updates the stored coordinates of the estimated tracking positions with the coordinates of the newly estimated tracking positions that are newly estimated in B3 (B15).

Thereafter, the output frame setting section 17 makes a determination as to whether the output frame update flag is "ON" (B17). If it is determined that the flag is "ON" (B17, Yes), the output frame setting section 17 updates the current output frame based on the coordinates of the tracking areas that are updated in B15 (B19). Specifically, for example, the output frame setting section 17 calculates the average of the tracking positions estimated in the previous predetermined number of frame images (e.g. 15 frame images), calculates the display position of an output frame of a predetermined size that has a center point at the averaged position, and updates the current output frame with the calculated output frame. The size of the output frame may be arbitrary selectable by the user within a predetermined range, which will be described in detail later.

Then, the image processing device 1 retrieves the frame image next to the current frame image (the data of the next frame image) and sets the retrieved frame image as a target frame image (B21). Then, the process returns to the tracking position estimation processing (B3).

If it is determined in the tracking position adequacy determining processing that the estimated tracking positions are inadequate (B13, inadequate), the tracking position re-estimating section 16 performs tracking position re-estimation processing (B23).

Figure 6:
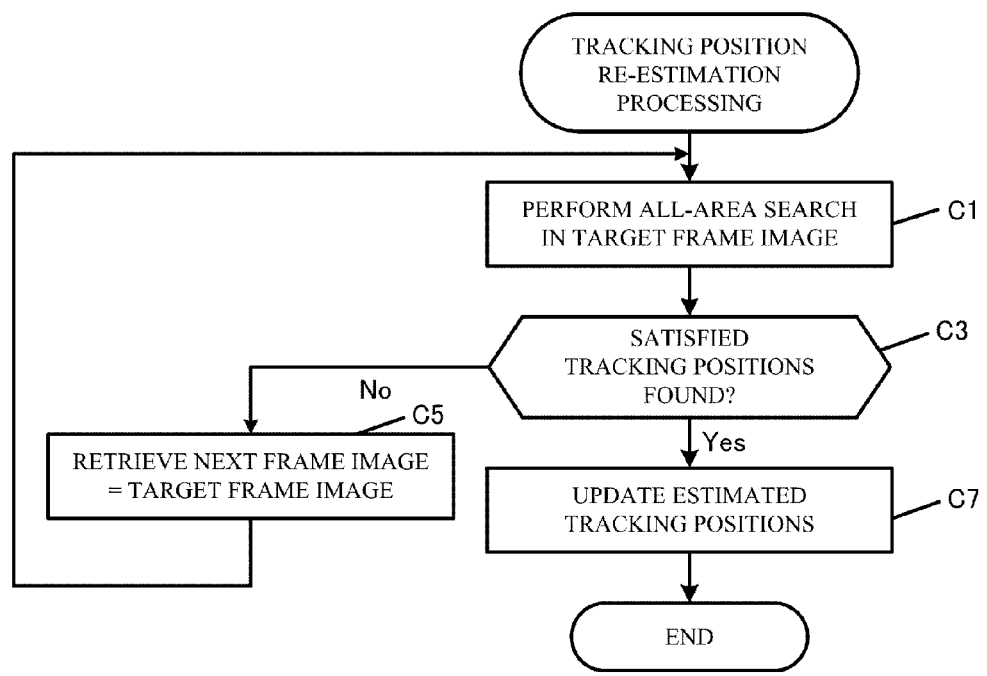
FIG. 6 is a flowchart of tracking position re-estimation processing, illustrating an example of the flow thereof.

FIG. 6 is a flowchart of the tracking position re-estimation processing, illustrating an example of the flow thereof.

The tracking position re-estimating section 16 performs an all-area search in the target frame image with respect to each of the first and second tracking areas based on the color information of the first tracking area or the color information of the second tracking area, so as to re-estimate the first and second tracking positions (C1). Specifically, the tracking position re-estimating section 16 searches areas that have a color similar to the tracking areas in the target frame image.

Then, with respect to the tracking positions that are re-estimated by the all-area search in C1, the tracking position re-estimating section 16 makes a determination as to whether there is a pair consisting of a re-estimated tracking position with reference to the first tracking area (hereinafter referred to as a "first re-estimated tracking position") and a re-estimated tracking position with reference to the second tracking area (hereinafter referred to as a "second re-estimated tracking position") that satisfies the closeness condition (C3).

If it is determined that there is no pair of tracking positions that satisfies the closeness condition (C3, No), the tracking position re-estimating section 16 retrieves the frame image next to the target frame image (the data of the next frame image) and sets the retrieved frame image as a target frame image (C5). Then, the process returns to C1.

If it is determined that there is a pair of tracking positions that satisfies the closeness condition (C3, Yes), the tracking position re-estimating section 16 updates the coordinates of the currently stored estimated tracking positions with the coordinates of the re-estimated tracking positions (C7). Then, the tracking position re-estimation processing ends.

In the embodiment, an all-area search is performed for ease of description. However, it is not always necessary to search the entire area of the target frame image. That is, the tracking position re-estimating section 16 may perform re-estimation processing such that the search starts from the vicinity of the originally estimated first and second tracking positions that are estimated in the tracking position estimation processing (B3), and the search ends when tracking positions that satisfy the closeness condition are found. Specifically, the tracking position re-estimating section 16 searches the predetermined area around the originally estimated first or second tracking position and makes a determination as to whether there is a pair of tracking positions that satisfies the closeness condition (C3). If there is no pair of tracking positions that satisfies the closeness condition (C3, No), the tracking position re-estimating section 16 expands the search area and continues the search, and the makes a determination as to whether there is a pair of tracking positions that satisfies the closeness condition (C3). If it is determined that a pair of tracking positions that satisfies the closeness condition is found (C3, Yes), the tracking position re-estimating section 16 ends the search and updates the coordinates of the currently stored estimated tracking positions with the coordinates of the re-estimated tracking positions (C7).

Alternatively, the search area may be specified according to a user operation, and the tracking position re-estimating section 16 may perform the search in the specified search area.

Back to FIG. 5, after the tracking position re-estimation processing is performed, the output frame setting section 17 turns the output frame update flag to "OFF" (B25). Then the process proceeds to B21.

When it is determined in the tracking position adequacy determination processing that the estimated tracking positions are inadequate (B13, inadequate), it means that the tracking positions are not correctly estimated. As used herein, "lost" is the term denoting an incorrect estimation of the tracking positions.

Lost mainly occurs when an object different from the target overlaps and comes in front of the target so that the target is hidden behind the foreside object, i.e. when the so-called "occlusion" occurs. In the embodiment, since the tracking is performed based on the color information of the target, when the color of an object that comes in front of the target is similar to the color of the target, the foreside objet may sometimes be erroneously recognized as the target so that the tracking target slides to the different object.

To address such a case, the tracking position re-estimation processing is performed (B23) so that the tracking positions are re-estimated. In the tracking position re-estimation processing, the tracking positions are re-estimated by the all-area search based on the color information of the tracking areas. However, the tracking positions thus re-estimated do not always correspond to the actual position of the target. For this reason, the output frame update flag is turned to "OFF" (B25) so that the output frame is not updated (B19). That is, the output frame update is suspended, and the output frame is fixed at the current position.

However, after the tracking positions are re-estimated, when the subsequent frame images are sequentially read and tracking positions are estimated in the tracking position estimation processing (B3), the newly estimated tracking positions are included in the last output frame before the lost in some cases (B7, Yes). In this case, the output frame update flag is turned to "ON" (B9) so that the output frame is updated again. That is, updating the output frame that has been fixed is resumed. Here, as described above, the determination of whether the tracking positions are included in the output frame (B7) may be made as to whether the calculated midpoint position is included within a predetermined range based on the output frame, for example, within a predetermined distance from the output frame or within a predetermine distance from the center of the output frame.

In the above description, if it is determined in the tracking position adequacy determination processing that the estimated tracking positions are inadequate (B13, inadequate), the tracking position re-estimating section 16 performs the tracking position re-estimation processing (B23). Instead, the following processing may be performed. If it is determined in the tracking position adequacy determination processing that the estimated tracking positions are inadequate (B13, Inadequate), the image processing device 1 retrieves the frame image next to the current frame image (the data of the subsequent frame image) and sets the retrieved frame image as a target frame image (B21). Then, the processing returns to the tracking position estimation processing (B3). If it is determined in the tracking position adequacy determining processing that the estimated tracking positions in the next frame image are inadequate (B13, inadequate), the image processing device 1 may repeat the routine of retrieving a still subsequent frame image, setting the retrieved frame image as a target frame image (B21) and returning the process to the tracking position estimation processing (B3) until it is determined that the estimated tracking positions are adequate (B13, adequate). Until it is determined in the tracking position adequacy determining processing that the estimated tracking positions are adequate, the current frame image continues to be displayed. It is preferred that the tracking positions are determined to be lost if this routine is repeated for a predetermined number of times, and the tracking position re-estimating section 16 then performs the tracking position re-estimation processing (B23).

Back to FIG. 4, after the tracking processing is started, the lock-on motion picture generating section 18 performs the lock-on motion picture generation processing (A11). Specifically, the processing in which the lock-on motion picture generating section 18 extracts an output target area (e.g. a rectangular area of a predetermined size), which includes the output frame located at around the center that is set and updated in the tracking processing, from a frame image of the original motion picture so as to generate a sub-frame image is performed on each of the frame images of the original motion picture. Then, the lock-on motion picture generating section 18 generates the lock-on motion picture that is composed of the generated series of sub-frame images. Then, the image processing ends.

FIG. 7 (1) to FIG. 7 (6) are explanatory views of the output frame. As in FIG. 2 (1) and FIG. 2 (2), FIG. 7 (1) to FIG. 7 (6) illustrate frame images of a motion picture in which Person A and Person B are shown.

As illustrated in FIG. 7 (1), the first and second tracking areas R1, R2 are set respectively on the upper body and the lower body of Person A in the tracking area setting processing (A3 in FIG. 4). Then, the color information of the first and second tracking areas R1, R2 are obtained (A5 in FIG. 4), and an initial output frame F0 is set, which is a rectangle that includes the first and second tracking areas R1, R2 and Person A (A7 in FIG. 4).

It is preferred that the user is allowed to change the size of the output frame to a desired size within a predetermined range. Further, the image processing device may be configured such that, after the output frame of a predetermined size is displayed, the user is allowed to change it to a desired size within a predetermined range.

When the output frame of a predetermined size is displayed, the predetermined size may be selected according to, for example, the distance between the first estimated tracking position and the second estimated tracking position. In this case, the vertical length of the output frame may be set to, for example, four times the length of the distance between the first estimated tracking position and the second estimated tracking position, and the horizontal length may be set to twice the length of the distance. Alternatively, the size setting of the output frame may be linked to the original motion picture and stored in the original image memory 20. When the same original motion picture is used, the previous size setting of the output image may be used as the default setting.

Thereafter, the tracking position estimation processing is performed on the next frame image so that the first and second estimated tracking positions P1, P2 are determined (B3 in FIG. 5). If the reliability of the first estimated tracking position P1 and the reliability of the second estimated tracking position P2 satisfy the high reliability condition and the distance d between the first estimated tracking position P1 and the second estimated tracking position P2 satisfies the closeness condition, it is determined that the adequacy determining condition is satisfied in the tracking position adequacy determination processing. Accordingly, it is determined that the estimated tracking positions are adequate (B13 in FIG. 5, adequate). In this case, the coordinates of the previous estimated tracking positions are updated with the coordinates of the newly estimated tracking positions (B15 in FIG. 5). Based on the updated coordinates of the estimated tracking positions, the output frame is updated from the initial output frame F0 to a new output frame F1 as illustrated in FIG. 7 (2) (B17 in FIG. 5, Yes, then B19).

Thereafter, the tracking position estimation processing is further performed on the third frame image as illustrated in FIG. 7 (3) so that the first and second estimated tracking positions P1, P2 are determined (B3 in FIG. 5). In this step, suppose that Person A is hidden behind Person B who moves to the front of Person A, i.e. occlusion occurs, and the lower body of the Person B is erroneously determined as the second estimated tracking position P2. As a result, the distance d between the first estimated tracking position P1 and the second estimated tracking position P2 does not satisfy the closeness condition. In this case, it is determined in the tracking position adequacy determination processing that the adequacy determining condition is not satisfied, and it is therefore determined that the estimated tracking positions are inadequate, and Person A is lost (B13 in FIG. 5, inadequate). Then, the tracking position re-estimation processing is performed (B23 in FIG. 5). However, since the output frame update flag is set to "OFF" (B25 in FIG. 5), update of the output frame F1 is suspended, and the output frame is fixed at the same position as illustrated in FIG. 7 (3). That is, the output frame F1 is maintained at the same position as the position illustrated in FIG. 7 (2), and Person A is not shown in the output frame F1 in FIG. 7 (3).

Alternatively, the output frame may be displayed as follows after the tracking target is lost. That is, the output frame F1 is not fixed at the time of the lost but continues the last movement for a predetermined period of time after the lost. The output frame then gradually slows down the movement and stops. Further, the size of the output frame F1 may be gradually increased as the movement is slowed down, and the output frame F1 may finally be increased to the size of the entire frame image. When the adequacy determining condition is satisfied in the repeat tracking position adequacy determination processing while the size of the output frame is being increased, the size of the output frame F1 may be reduced to the original size. In this step, it is preferred that the size is reduced not immediately but gradually over a predetermined time. The output frame F1 may be expanded to the entire frame image simultaneously at the lost.

Thereafter, as illustrated in FIG. 7 (4), the output frame F1 is not updated, and the tracking position estimation processing is performed based on the re-estimated tracking positions that are re-estimated in the tracking position re-estimation processing (B23, B25, then B3 in FIG. 5). Then, as illustrated in FIG. 7 (5), when the midpoint Pc between the first estimated tracking position P1 and the second estimated tracking position P2 estimated in the tracking position estimation processing is included in the output frame F1 (B5, Yes, then B7, Yes in FIG. 5), the output frame update flag is turned to "ON" (B9 in FIG. 5) so that fixing the output frame is released, and the output frame update is resumed.

Figure 15:
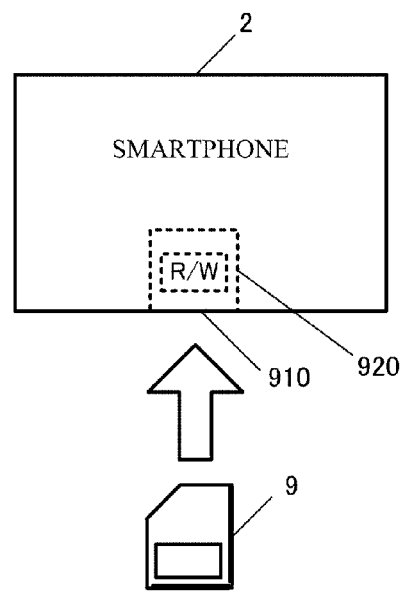
FIG. 15 illustrates an example of a recording medium.

Thereafter, if the reliability of the first tracking position P1 and the reliability of the second tracking position P2 determined in the tracking position estimation processing satisfy the high reliability condition and the distance d between the first estimated tracking position P1 and the second estimated tracking position P2 satisfies the closeness condition, it is determined that the estimated tracking positions are adequate (B13 in FIG. 15, adequate). Then, the coordinates of the estimated tracking positions are updated with the coordinates of the newly estimated tracking positions (B15 in FIG. 5). Accordingly, the output frame is updated from the output frame F1 to a new output frame F2 as illustrated in FIG. 7 (6) (B19 in FIG. 5).

Thereafter, the above-described process is repeated.

1-3. Functions and Advantageous Effects

The image processing device 1 includes: the tracking area setting section 11 that sets a tracking area in a frame image of an original motion picture; the color information obtaining section 12 that obtains color information of the tracking area set by the tracking area setting section 11; the tracking position estimating section 14 that sequentially estimates a tracking position with reference to the tracking area with respect to each frame image by using the color information obtained by the color information obtaining section 12; the output frame setting section 17 that sets an output frame that includes the tracking area set by the tracking area setting section 11 and that updates the output frame based on the estimated tracking position as the tracking position is sequentially estimated by the tracking position estimating section 14; and the lock-on motion picture generating section 18 that generates a lock-on motion picture that addresses the output frame updated sequentially by the output frame setting section 17.

This configuration enables a result of tracking a target to be provided as a lock-on motion picture that addresses the target.

1-4. Variation 1-4-1. Pattern Tracking

Figure 8:
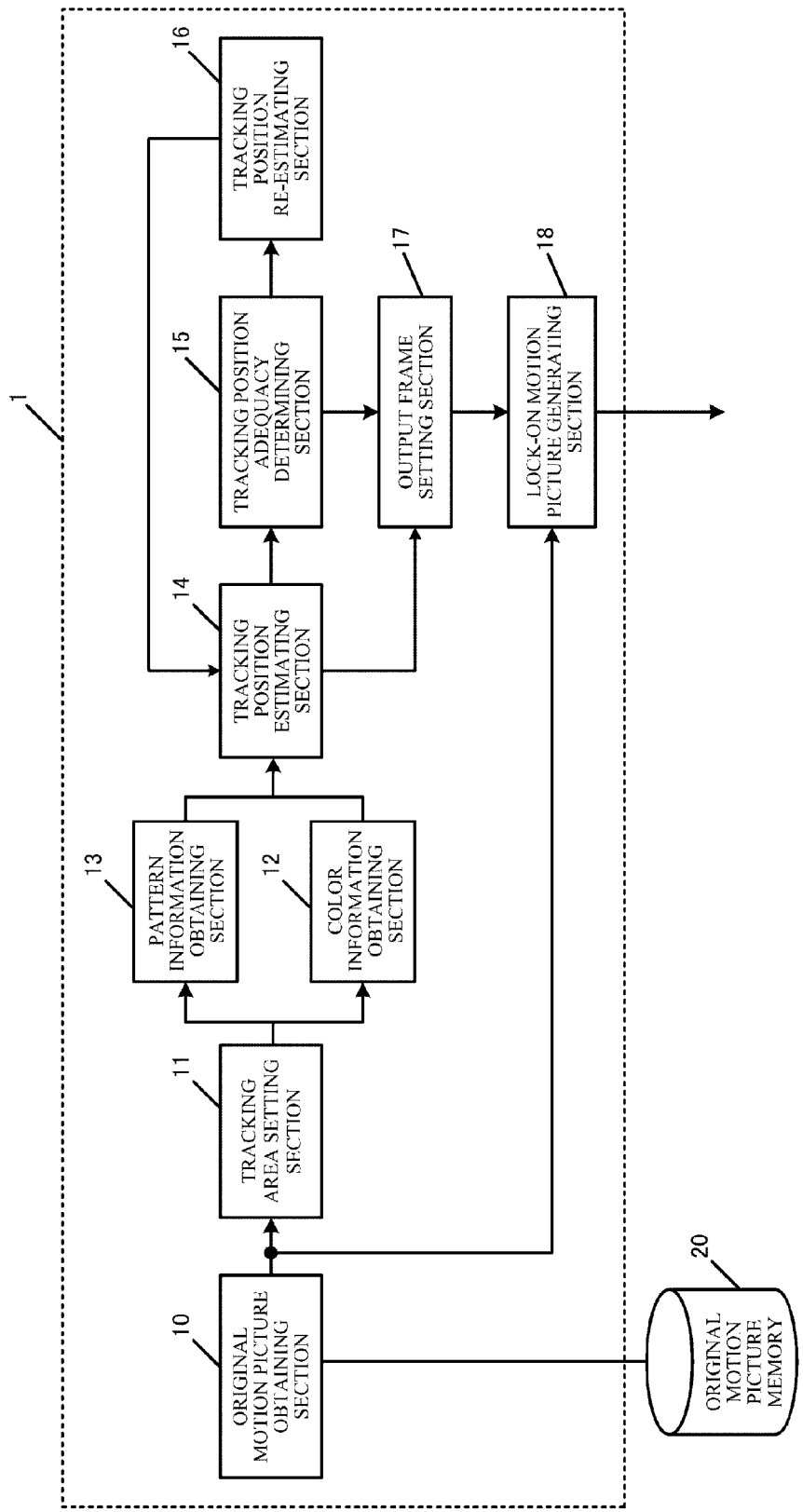
FIG. 8 illustrates another example of the functional configuration of the image processing device.

FIG. 8 illustrates another example of the functional configuration of the image processing device 1. The image processing device 1 further includes a pattern information obtaining section 13 in addition to the functional sections illustrated in FIG. 1.

The pattern information obtaining section 13 obtains pattern information of a tracking area set by a tracking area setting section 11. The pattern information is a modeled pattern of the tracking area. For example, the pattern information is composed of the pixel value data of a reduced image of the tracking area at a predetermined scale.

In the tracking position estimation processing of this case, the tracking position estimating section 14 searches a target frame image for an area that has the most similar pattern to the tracking area (hereinafter referred to as a "similar pattern area") by using a technique of pattern matching or the like, in which the search is made within a predetermined region around the tracking area that is updated in the previous frame image based on an estimated tracking position.

Then, the tracking position estimating section 14 specifies the center coordinates (x', y') of the similar pattern area. The tracking position estimating section 14 calculates a second probability distribution $\varphi'$ (x, y) for use when estimating the tracking areas according to the following equation (1) from the probability distribution $\varphi$ (x, y) with components of the pixel values (x, y) from the frame image, which is calculated based on the color model obtained by the color information obtaining section 12, and the center coordinates (x', y') of the similar pattern area.

$$\varphi'(x,y)=G(x,y;x',y',\sigma)*\varphi(x,y) \tag{1}$$

In the equation, "G (x, y; x', y', $\sigma$)" is a Gaussian function that represents a two-dimensional normal distribution with an average of (x', y') and a deviation of "$\sigma^2$". Further, the symbol "*" represents convolution. That is, the second probability distribution $\varphi'$ (x, y) is calculated by convolution of the probability distribution based on the color model and the Gaussian distribution based on the pattern model.

In the variation, the tracking position estimating section 14 estimates the tracking position based on the second probability distribution $\varphi'$ (x, y) by the Mean-Shift method. By setting the deviation $\sigma^2$ in the second probability distribution $\varphi'$ (x, y) of equation (1) to a small value when estimating the tracking position, it is possible to estimate the tracking area mainly based on the pattern of the tracking area. That is, it is possible to perform estimation of the tracking area that puts weight on the pattern of the target.

This estimation of the tracking area that uses a combination of the color information and the pattern information is particularly useful for tracking a target that is likely to show the same color and the same shape in any direction. For example, when target tracking is performed in a motion picture in which a person playing a ball sport (e.g. basketball) is shown, there is no change in the color or shape of the ball in any direction. Accordingly, the tracking area can be set on an area in which the ball is shown in a frame image so that the tracking processing that tracks the ball as a target is performed. In this case, when the ball is composed of a single color, it is preferred that the single-color model is used as the color model rather than the multi-color model in the tracking processing.

For another example, the tracking area may be set on a moving rigid body (e.g. automobile), and the tracking processing may be performed that tracks the rigid body as a tracking target.

1-4-2. Priority Setting

Instead of setting a plurality of tracking areas on a single target, tracking areas may be set on a plurality of targets. For example, when targets are tracked in an original motion picture in which a person playing a ball sport is shown as described above, a first tracking area and a second tracking area may be set respectively on a part of the person and a part of the ball, and the tracking processing is performed that tracks the person and the ball as targets.

In this case, while the first tracking area set on the person and the second tracking area set on the ball are tracked based on the respective color information, the positional relationship between the person and the ball always changes. That is, the person and the ball draw close to each other and move away from each other. Accordingly, for example, when the ball moves far away from the person, the distance between the first estimated tracking position of the person and the second tracking position of the ball becomes so great that the user cannot view a close-up of a desired scene (e.g. the play around the ball).

To avoid this, the image processing device 1 may include a priority setting section as a functional section thereof.

The priority setting section sets the tracking priority among the targets. The output frame setting section 17 determines an output frame to be updated based on the priority set by the priority setting section. In addition to the tracking priority, a maximum allowable distance between the plurality of targets may also be set. In the above-described example, tracking priority is set with respect to the person and the ball, and the maximum allowable distance between the person and the ball is also set. If the distance between the estimated tracking position of the person and the estimated tracking position of the ball is not greater than the maximum allowable distance, the output frame is updated so that it includes both targets. If the distance is greater than the maximum allowable distance, the output frame is updated so that it includes the target with the higher priority.

The tracking processing may be changed according to the nature of the targets. For example, when all of the targets on which the tracking areas are set change shape, the tracking processing using only color information is performed. When all of the targets on which the tracking areas are set do not change shape, the tracking processing using only pattern information is performed. When a part of the targets on which the tracking areas are set changes shape, the tracking processing using a combination of the color information and the pattern information is performed.

Even when a target changes shape, it is still possible to perform the tracking processing using pattern information, for example, by updating the pattern information of the target in every frame.

1-4-3. Adequacy Determining Condition

For example, the adequacy determining condition in the above-described tracking position adequacy determination processing may include a condition that the positional relationship in the vertical direction between the first estimated tracking position and the second estimated tracking position does not change. For example, in the case where the two tracking areas are set on the upper body and the lower body of a person as described above in the tracking processing, it is considered that the position of the upper body and the lower body is less likely to be reversed even when the person moves.

Accordingly, the positional relationship in the vertical direction between the first estimated tracking position, which is estimated with respect to the tracking area set on the upper body, and the second estimated tracking position, which is estimated with respect to the tracking area set on the lower body, is determined. If the positional relationship is not reversed, it may be determined that the estimated tracking positions are adequate.

In some cases, the positional relationship in the vertical direction of the upper body and the lower body of a person can be reversed. For example, when a person performs certain gymnastics such as floor or bar exercises, the positional relationship in the vertical direction of the upper body and the lower body is sometimes reversed. In such cases, it is favorable not to use the above-described adequacy determining condition. Accordingly, it is preferred that the adequacy determining condition is changeable according to the scene in which a target is tracked.

1-4-4. Exceptional Processing

The following exceptional processing may be performed as an exception when estimating the tracking positions.

(A) when the Reliability of any One of the Estimated Tracking Positions does not Satisfy the High Reliability Condition.

If the reliability of any one of the two estimated tracking positions of the first estimated tracking position and the second estimated tracking position does not satisfy the high reliability condition, it may be determined that the estimated tracking position with a reliability that does not satisfy the high reliability condition is lost while the other estimated tracking position with a reliability that satisfies the high reliability condition is correct. Then, the tracking may be continued only with the other tracking position. This is because the previous tracking would be wasted if the tracking processing is configured such that when either one of the first estimated tracking position and the second estimated tracking position is lost, the estimated tracking positions are uniformly determined to be inadequate, and tracking position re-estimation processing is performed.

(B) When the Estimated Tracking Positions do not Satisfy the Closeness Condition When the distance between the first estimated tracking position and the second estimated tracking position does not satisfy the closeness condition, the following two tracking position search processing are performed.

(1) A search region of a certain size is set on the upper side of the second tracking area including the second estimated tracking position, and first tracking position search processing is performed to search the search region for the first estimated tracking position.

(2) A search region of a certain size is set on the lower side of the first tracking area including the first estimated tracking position, and second tracking position search processing is performed to search the search region for the second estimated tracking position.

By performing the above-described two processing, four tracking positions are obtained in total, which are the first and second estimated tracking positions that are estimated in the tracking position estimation processing and the first and second searched tracking positions that are searched in the tracking position search processing.

With respect to the four tracking positions, a pair of tracking positions that does not include a tracking position with the lowest reliability, which is calculated based on the probability distribution, is selected from two pairs of tracking positions of "the first estimated tracking position and the second searched tracking position" and "the first searched tracking position and the second estimated tracking position", and the tracking positions of the selected pair are set respectively as new first and second estimated tracking positions. Then, the tracking is continued.

1-4-5. Re-estimation of Tracking Positions

Except for the case that the original motion picture is input in real time and the real-time output thereof is required, it is possible to perform the tracking processing as post processing. In such cases, the tracking position re-estimating section 16 may re-estimate the tracking positions going back in time from the time that the output frame update is resumed to the time that the output frame update was suspended.

Specifically, the tracking position re-estimating section 16 performs the tracking processing by the Mean-Shift method by using the color information that was used in estimating the tracking positions at the time of lost, so as to re-estimate the tracking positions going back in time from the resumption of the output frame update to the suspension thereof. To describe this process with FIG. 7 (1) to FIG. 7 (6), the tracking positions are re-estimated going back in time from the frame of FIG. 7 (5) where tracking was resumed to the previous frame of FIG. 7 (4) and then to the second previous frame of FIG. 7 (3) where a lost occurred.

Such re-estimation of the tracking positions going back in time enables the user to view the past behavior of a target such as a person or an automobile. To view a past behavior, the target and its tracking areas are set, and a period of time in the past for viewing the target is set to, for example, 1 minute from the present to the past according to the capacity of the original image memory 20. Based on the setting information, the tracking position re-estimating section 16 performs the tracking processing in the above-described manner so as to re-estimate the tracking positions in one minute from the present to the past. Once the re-estimation is completed, it is possible to display the movement of the target in the past one minute as a motion picture. Since the target and the tracking areas are set in the currently displayed frame, this method is advantageous to the user in terms of efficiency and convenience compared to a case in which a frame from one minute ago is displayed and the target and the tracking areas are set in the frame.

1-4-6. Correction of Output Frame Position

The tracking processing by the Mean-Shift method always has a tendency of producing a noise that jiggles the estimated tracking positions. When the output frame is updated based on such estimated tracking positions, the noise causes a jiggling of the resultant lock-on motion picture.

To avoid this, the image processing device 1 may include an output frame position correcting section as a functional section thereof.

The output frame position correcting section calculates the displacement of the output frame between frame images based on the change of the coordinates of the output frame between the frame images. The output frame position correcting section calculates the average displacement of latest predetermined number of output frames (e.g. in the last 30 frames) and corrects the position of the output frame according to the average displacement, which is updated in every frame image. The lock-on motion picture generating section 18 generates a lock-on motion picture that addresses the output frame at the corrected position. In this way, it is possible to provide a lock-on motion picture with no jiggling.

2. Example

Next, a smartphone 2 that is an example of an electronic devices equipped with the above-describe image processing device 1 will be described. However, it should be understood that the examples of the present invention are not limited to the following example.

2-1. Functional Configuration

Figure 9:
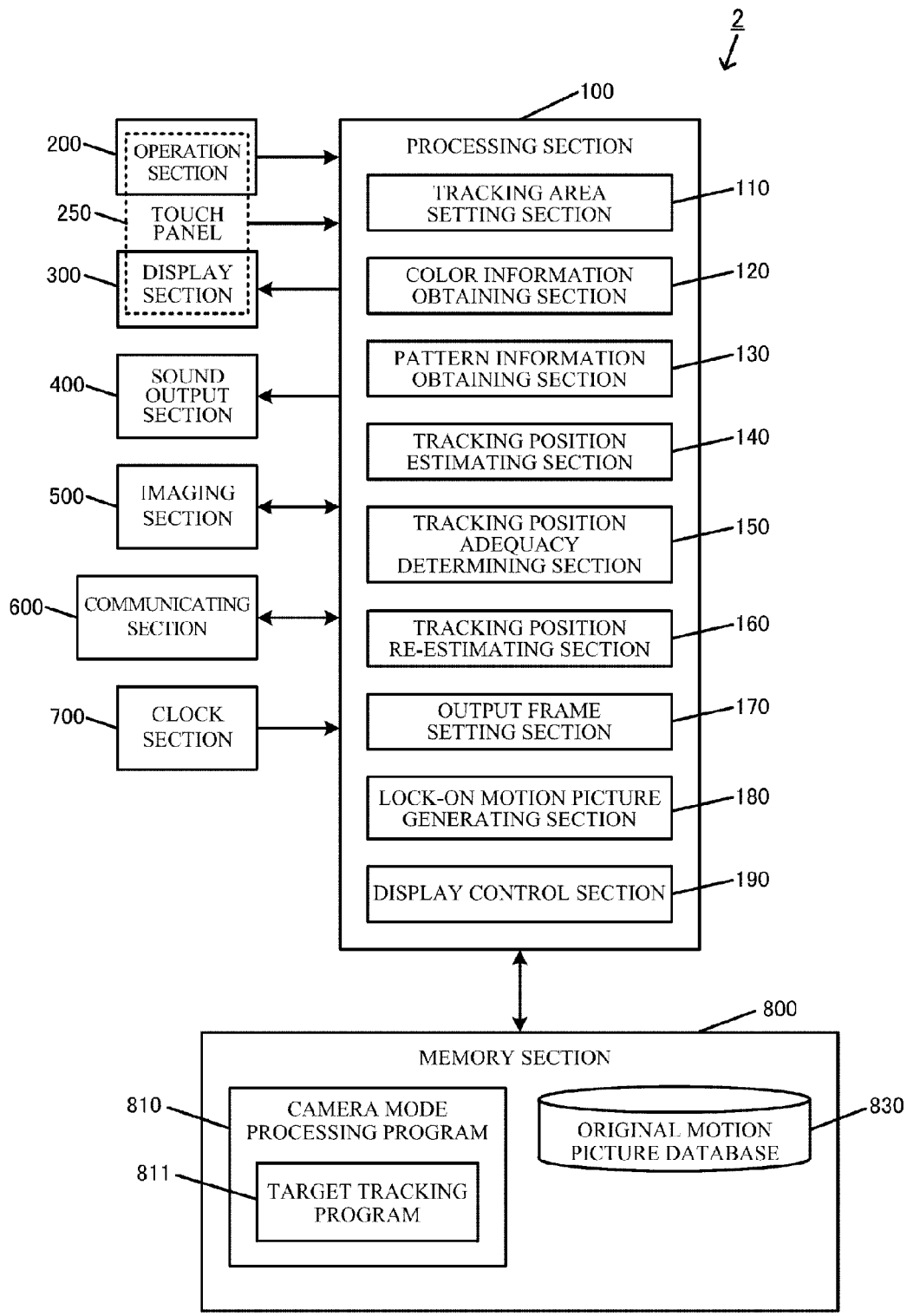
FIG. 9 illustrates an example of the functional configuration of a smartphone.

FIG. 9 is a block diagram of an example of the functional configuration of the smartphone 2.

The smartphone 2 includes a processing section 100, an operation section 200, a display section 300, a sound output section 400, an imaging section 500, a communicating section 600, a clock section 700 and a memory section 800.

The processing section 100 integrally controls the components of the smartphone 2 according to a variety of programs stored in the memory section 800 such as a system program and performs a variety of processing related to image processing. The processing section 100 includes a processor such as a CPU and DSP and an integrated circuit such as an ASIC.

The processing section 100 includes, as major functional sections, a tracking area setting section 110, a color information obtaining section 120, a pattern information obtaining section 130, a tracking position estimating section 140, a tracking position adequacy determining section 150, a tracking position re-estimating section 160, an output frame setting section 170, a lock-on motion picture generating section 180 and a display controlling section 190. The tracking area setting section 110 to the lock-on motion picture generating section 180 correspond to the respective functional components of the image processing device 1 in FIG. 8, namely, the tracking area setting section 11 to the lock-on motion picture generating section 18.

The operation section 200 includes an input device for a variety of user input operations on the smartphone 2 such as operation buttons, operation switches or a mouse. Further, the operation section 200 includes a touch panel 250 that is integrally formed with the display section 300. The touch panel 250 functions as an input interface between the user and the smartphone 2. The operation section 200 outputs an operation signal to the processing section 100 according to a user operation.

The display section 300, which is a display device including an LCD (liquid crystal display) and the like, displays a variety of display screens based on a display signal output from the processing section 100. The display section 300 is integrally formed with the touch panel 250 so as to constitute a touch screen. A variety of images such as photographed images and corrected images are displayed on the display section 300.

The sound output section 400, which is a sound output device including a speaker and the like, outputs a variety of sounds based on a sound output signal output from the processing section 100.

The imaging section 500, which is an imaging device capable of capturing an image of an arbitrary scene, includes an imaging element such as a CCD (charged coupled device) imaging sensor or a CMOS (complementary MOS) imaging sensor. The imaging section 500 converts an optical signal to an electric signal and outputs data of a digitalized photographed image to the processing section 100.

The communicating section 600 is a communicating device for transmitting and receiving information to be used in the device to and from an external information processing device and an external image displaying device. The communicating section 600 may use any of a variety of communication methods including wired connection via a cable compatible with a predetermined communication standard, connection via an intermediate device known as a cradle, which also serves as a charger, a wireless connection using a near field communication technique, and the like.

The clock section 700, which is an internal clock of the smartphone 2, includes, for example, a quartz oscillator composed of a quartz resonator and an oscillating circuit. The time acquired by the clock section 700 is constantly output to the processing section 100.

The memory section 800 is a storage device that includes a volatile or non-volatile memory such as a ROM an EEPROM, a flash memory and a RAM, and/or a hard disk drive, and the like. The memory section 800 stores a system program for the processing section 100 to control the smartphone 2, as well as programs and data for a variety of image processing.

In the example, the memory section 800 stores a camera mode processing program 810 that is read out and executed as a camera mode processing by the processing section 100. The camera mode processing program 810 includes a target tracking program 811 as a sub-routine, which is read and executed by the processing section 100 as the target tracking processing.

The memory section 800 further includes an original motion picture database 830 in which data of motion pictures input from the imaging section 500 to the processing section 100 is stored.

2-2. Processing Flow

Figure 10:
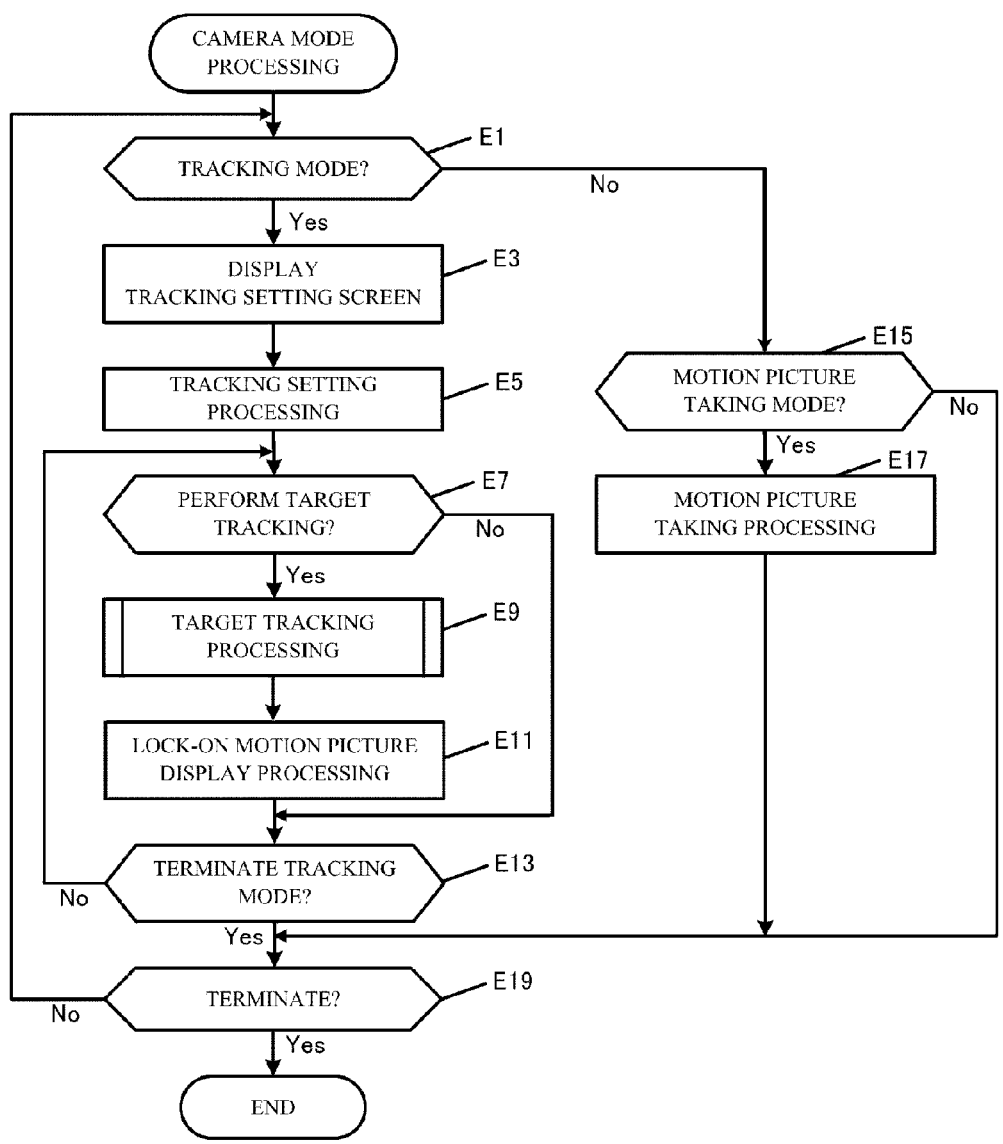
FIG. 10 is a flowchart of camera mode processing, illustrating an example of the flow thereof.

FIG. 10 is a flowchart of an example of the flow of the camera mode processing, which is performed by the processing section 100 according to the camera mode processing program 810 stored in the memory section 800. The camera mode processing is performed when the user activates a camera application.

First, the processing section 100 makes a determination as to whether the mode selected by the user through the operation section 200 is a tracking mode (E1). The tracking mode involves tracking a target in an original motion picture that is captured in a motion picture capturing mode in which the user fixes the smartphone 2 at a certain point, and displaying a lock-on motion picture that addresses an output frame on the display section 300.

If it is determined that the tracking mode is selected (E1, Yes), the processing section 100 performs a control to display a tracking setting screen on the display section 300 (E3). Specifically, the processing section 100 displays the tracking setting screen that prompts the user to select the setting between "color model" or "color model and pattern model".

Then, the processing section 100 performs the tracking setting processing (E5). Specifically, the processing section 100 configures the settings for the tracking according to a user selection on the operation section 200 in the tracking setting screen.

Thereafter, the processing section 100 makes a determination as to whether to track a target (E7). Specifically, the processing section 100 makes a determination as to whether to track a target based on whether a user execution operation on the operation section 200 is detected.

If it is determined to track a target (E7, Yes), the processing section 100 performs a target tracking processing according to the target tracking program 811 stored in the memory section 800 (E9).

Figure 11:
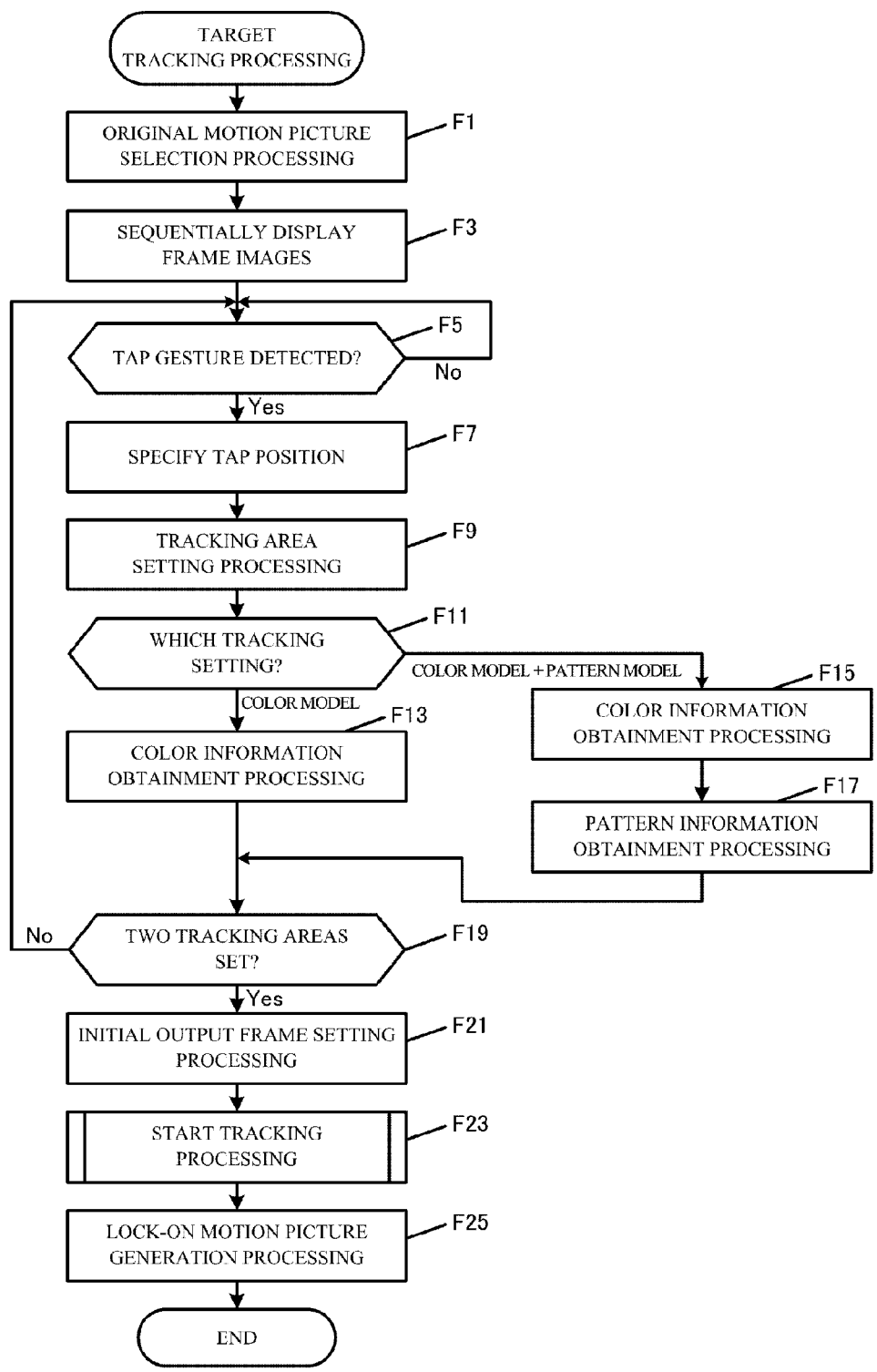
FIG. 11 is a flowchart of a target tracking processing, illustrating an example of the flow thereof.

FIG. 11 is a flowchart of the target tracking processing, illustrating an example of the flow thereof.

First, the display controlling section 190 performs original motion picture selection processing to display a list of original motion pictures that are stored in the original motion picture database 830 in the memory section 800 on the display section 300 so as to prompt the user to select an original motion picture in which a target is to be tracked (F1).

Then, the display controlling section 190 decodes the data of the original motion picture selected by the user and sequentially displays frame images of the original motion picture on the display section 300 (F3).

Thereafter, the processing section 100 makes a determination as to whether a tap gesture on the touch panel 250 is detected (F5). If it is determined that a tap gesture is detected (F5, Yes), the processing section 100 specifies the tap position in the currently displayed frame image of the tap gesture (F7).

Then, the tracking area setting section 110 performs tracking area setting processing (F9). Specifically, the tracking area setting section 110 sets a certain area that includes the coordinates of the tap position specified in F7 as a tracking area (F11). The tracking area thus set corresponds to the first tracking area since it is set according to the first tap gesture.

Then, the processing section 100 specifies the tracking setting configured in E5 (F11). If it is specified that the tracking setting is the "color model" (F11, color model), the color information obtaining section 120 performs color information obtainment processing (F13). If it is specified that the tracking setting is the "color model and pattern model" (F11, color model and pattern model), the color information obtaining section 120 performs the color information obtainment processing (F15). Then, the pattern information obtaining section 130 performs pattern information obtainment processing. (F17).

After F13 or F17, the processing section 100 makes a determination as to whether two tracking areas are set (F19). If two tracking areas are not yet set (F19, No), the process returns to F5. In this case, when the user performs the second tap gesture, another tracking area is set in F9. The tracking area thus set corresponds to the second tracking area since it is set according to the second tap gesture.

If two tracking areas are set (F19, Yes), the output frame setting section 170 performs the initial output frame setting processing (F21). Further, the processing section 100 starts the tracking processing (F23). Further, the lock-on motion picture generating section 180 performs the lock-on motion picture generation processing (F25). These processing are as described in the processing of the image processing device 1. Then, the target tracking processing ends.

Returning to FIG. 10, after the target tracking processing is performed, the display controlling section 190 performs motion picture display processing (E11). Specifically, the lock-on motion picture that is generated in the lock-on motion picture generation processing is displayed on the display section 300.

The lock-on motion picture that is generated in the lock-on motion picture generation processing may also be displayed on an external display terminal that is connected by the communicating section 600 in a wired or wireless manner. The lock-on motion picture may also be displayed on an external display terminal that is connected by the communicating section 600 through a network. In this case, a frame motion picture on which the output frame is overlaid, such as those illustrated in FIG. 7, is displayed on the display section 300 of the smartphone 2 while the lock-on motion picture is displayed on the external display terminal.

The display controlling section 190 overlays tracking area frames including the tracking areas on the lock-on motion picture so that the user can understand the change of the tracking areas between the frame images of the lock-on motion picture.

Since there are two tracking areas of the first tracking area and the second tracking area, the display controlling section 190 overlays a first tracking area frame enclosing the first tracking area and a second tracking area frame enclosing the second tracking area on the lock-on motion picture so that the user can understand the respective tracking areas. The frame lines of the tracking area frames are displayed in a predetermined color (e.g. blue).

The frame line of the first tracking area and the frame line of the second tracking area may be displayed in different colors from each other (e.g. one in blue and the other in yellow) so that the user can distinguish the first tracking area frame and the second tracking area frame from each other. Instead of coloring the frame lines of the tracking area frames, the frame lines may be displayed in solid lines, dashed lines or the like.

Further, the display controlling section 190 overlays the output frame on the lock-on motion picture so that the user can understand the change of the output frame between the frame images of the lock-on motion picture. The display controlling section 190 displays the frame line of the output frame in a different color (e.g. red) from the frame lines of the tracking area frames so that the user can distinguish the output frame from the tracking area frames.

Instead of coloring the frame line of the output frame, the frame line may be displayed in a solid line, a dashed line or the like.

Thereafter, the processing section 100 makes a determination as to whether to terminate the tracking mode (E13). If it is determined not to terminate the tracking mode (E13, No), the process returns to E7. If it is determined to terminate the tracking mode (E13, Yes), the processing section 100 makes a determination as to whether to terminate the processing (E19). If it is determined to continue the processing (E19, No), the process returns to E1. If it is determined to terminate the processing (E19, Yes), the target tracking processing ends.

If it is determined in E1 that the tracking mode is not selected (E1, No), the processing section makes a determination as to whether a motion picture capturing mode is selected (E15). If it is determined that the mode is selected (E15, Yes), the processing section 100 performs the motion picture capturing processing (E17). Specifically, the processing section 100 controls the imaging section 500 to capture a motion picture according to a user operation and then stores the captured motion picture in the original motion picture database 830 in the memory section 800. Then, the process proceeds to E19.

In the lock-on motion picture display processing in E11, the lock-on motion picture may be displayed over the entire screen of the display section 300. That is, the lock-on motion picture that is displayed on the display section 300 may be composed of sub-frame images each of which is an output target area (e.g. a rectangular area of a specified size) enlarged to the screen size of the display section 300 including the output frame. In this case, it is required to adjust the size of the output frame corresponding to the output target area. To achieve this, the output frame may be enlarged at the same magnification as the output target area and overlaid at the corresponding position.

The tracking area frames may be displayed in the same way.

The magnification of the lock-on motion picture displayed on the display section 300 may be changeable according to a user operation. Specifically, for example, a magnification scale for changing the magnification may be displayed on the display section 300 along with an operation bar that is slidable by the user. In response to a user operation of sliding the operation bar of the magnification scale, the lock-on motion picture may be displayed on the display section 300 that is composed of sub-frame images, each of which is an output target area enlarged to the magnification that corresponds to the sliding operation.

2-3. Display Screen

FIG. 12 (1) and FIG. 12 (2) illustrate examples of display screens that are displayed on the display section 300 of the smartphone 2.

FIG. 12 (1) illustrates a display screen that is one scene of an original motion picture in which three persons of A, B and C are shown. While the display screen is displayed, the first tracking area R1 is set in response to a user tap gesture on the touch panel 250 at the body part (upper body) of Person A. Further, the second tracking area R2 is set in response to a user tap gesture on the touch panel 250 at the body part (lower body) of Person A. Based on the first and second tracking areas R1, R2 thus set, the tracking processing and the lock-on motion picture generation processing are performed so that a lock-on motion picture that addresses the Person A as a target is generated. FIG. 12 (2) illustrates a display screen that is one scene of the lock-on motion picture.

In the display screen, a rectangular tracking area frame Fr1 enclosing the first tracking area R1 as illustrated in FIG. 12 (1) and a rectangular tracking area frame Fr2 enclosing the second tracking area R2 are shown. The frame lines of the first and second tracking area frames Fr1, Fr2 are shown in blue, for example. Further, the rectangular output frame F is also shown in the display screen. The frame lines of the output frame F are shown in red, for example.

2-4. Functions and Advantageous Effects

The smartphone 2 includes the display section 300 that is integrally fon led with the touch panel 250, and the display controlling section 190 that controls the display section 300. The tracking area setting section 110 sets the tracking areas based on tap gestures on the touch panel 250, and the display controlling section 190 displays the lock-on motion picture generated by the lock-on motion picture generating section 180 on the display section 300.

This configuration enables tracking a target based on the tracking areas that are set based on user tap gestures. This configuration also enables the user to check a lock-on motion picture that addresses the target.

3. Second Example

A second example is a smartphone that has the same configuration as the smartphone 2 of the first example except that it is further configured to allow a user to perform an operation of moving the output frame in a currently displayed motion picture and to semi-automatically set a target according to the operation of moving the output frame.

3-1. Processing Flow

FIG. 13 is a flowchart of an example of the flow of a second camera mode processing which is performed by the processing section 100 of the smartphone 2 in replacement of the camera mode processing. The same reference signs are denoted to the same steps as those of the camera mode processing, and repetitive description is omitted.

After the lock-on motion picture display processing in E11, the processing section 100 makes a determination as to whether the user performs an operation of switching the screen to the original motion picture (G13).

If it is determined that the switching operation is performed (G13, Yes), the display controlling section 190 performs original motion picture display processing (G15). Specifically, the display controlling section 190 displays the original motion picture selected in the original motion picture selection processing on the display section 300. In this step, the display controlling section 190 overlays tracking area frames F enclosing the tracking areas on the original motion picture so that the user can understand the change of the tracking areas between the frame images of the original motion picture. The frame lines of the tracking area frames F are shown in a predetermined color (e.g. blue), as they are in the lock-on motion picture.

Further, the display controlling section 190 overlays the output frame on the original motion picture so that the user can understand the change of the output frame between the frame images of the original motion picture. The output frame is shown in a different color (e.g. red) from the frame lines of the tracking area frames so that the user can distinguish the output frame from the tracking area frames.

Thereafter, the processing section 100 makes a determination as to whether an operation on a touch panel is detected (G17). If an operation is detected (G17, Yes), the processing section 100 performs second target tracking processing (G19).

Figure 14:
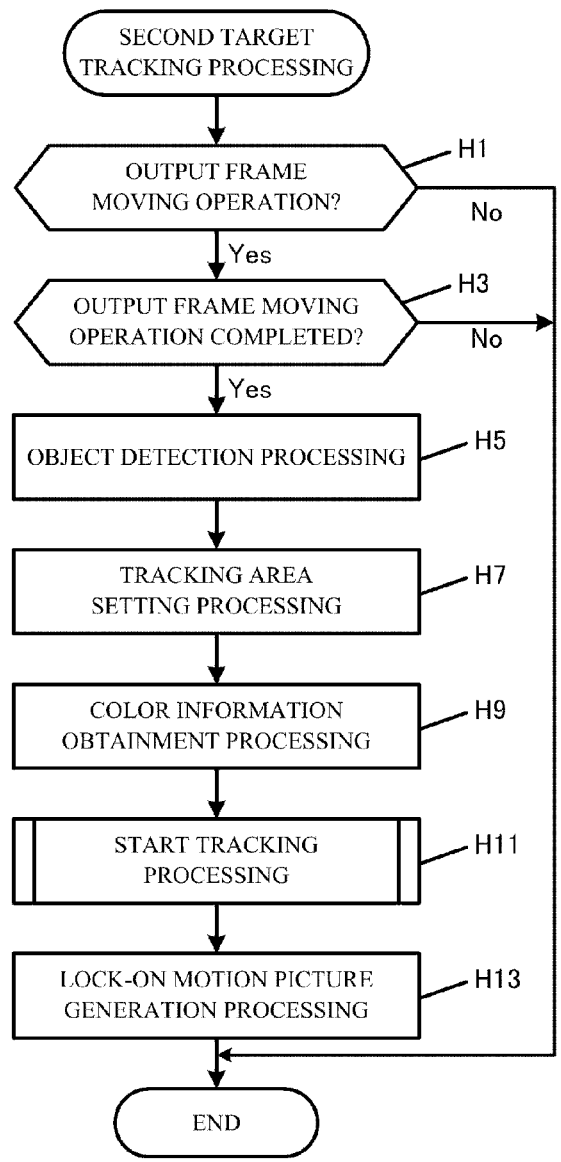
FIG. 14 is a flowchart of second target tracking processing, illustrating an example of the flow thereof.

FIG. 14 is a flowchart of the second target tracking processing, illustrating an example of the flow thereof.

First, the processing section 100 makes a determination as to whether the detected operation on the touch panel is an operation of moving the output frame overlaid on the original motion picture to an arbitrary position (hereinafter referred to as an "output frame moving operation") (H1). Specifically, if a long tap gesture of a predetermined duration (e.g. 1 second) at the display position of the output frame and a subsequent drag gesture are detected, it is determined that an output frame moving operation is performed.

If it is determined that an output frame moving operation is performed (H1, Yes), the processing section 100 makes a determination as to whether the output frame moving operation is completed (H3). Specifically, when it is detected that the drag gesture is stopped and the input on the touch panel 250 is undetected, it is determined that the output frame moving operation is completed.

If it is determined that the output frame moving operation is completed (H3, Yes), the processing section 100 performs object detection processing to detect an object present in the moved output frame (H5). The object detection processing can be performed by a technique known in the art such as pattern matching using model data of humans and other objects.

Then, the tracking area setting section 110 performs the tracking area setting processing (H7). Specifically, the tracking area setting section 110 searches the area of the object detected in H5 for two areas each composed of a uniform color based on the color information of each pixel of the object and sets the two areas thus found as the first and second tracking areas.

Thereafter, the color information obtaining section 120 performs the color information obtainment processing (H9). Specifically, the color information obtaining section 120 obtains the color information of the two tracking areas set in H7 as with the previously-described embodiment. Then, the processing section 100 starts the tracking processing (H11), and the lock-on motion picture generating section 180 performs the lock-on motion picture generation processing (H13). Then, the second target tracking processing ends.

In the above description, if it is determined that the output frame moving operation is completed (H3, Yes), the processing section 100 performs the object detection processing to detect an object present in the moved output frame (H5). However, the example is not limited thereto. For example, the processing section 100 may start the object detection processing (H5) when an output frame moving operation is detected (H1, Yes), and then perform the following tracking area setting processing (H7) and so on when a target is detected. In this case, the processing section 100 may start the tracking processing (H7) after it is determined that the output frame moving operation is completed (H3, Yes).

The color of the frame line of the output frame may be changed when an object is detected in the object detection processing (H5), so that the user is informed of detection of the object. Further, the output frame may be shown in different manners during the tracking processing by the processing section 100 and during the movement of the output frame according to a user operation. In this case, for example, the frame line of the output frame may be shown in a solid line during the tracking processing by the processing section 100 and in a dashed line during movement of the output frame according to a user operation. Alternatively, the frame line of the output frame may be shown in different colors.

Returning to FIG. 13, after the second target tracking processing, the processing section 100 makes a determination as to whether an operation of terminating display of the original motion picture is performed (G21). If it is determined that the operation is not performed (G21, No), the process returns to G17.

If it is determined that the operation of terminating the display of the original motion picture is performed (G21, Yes), the processing section 100 makes a determination as to whether an operation of switching the screen to the lock-on motion picture is performed (G23). If it is determined that the operation is performed (G23, Yes), the process returns to E11. If it is determined that the operation of switching the screen to the lock-on motion picture is not performed (G23, No), the process proceeds to E13.

In the above-described object detection processing of detecting an object to be a tracking target, a plurality of tracking targets may be set in the original motion picture beforehand, and one or more tracking targets that are present in the output frame among the plurality of tracking target may be detected. For example, when a scene of a sport is photographed, a moving subject such as a player of interest is extracted from a motion picture or a still image by a manual user operation or a semi- or fully-automatic operation, and the color information of the extracted moving subject is registered beforehand. Then, in the object detection processing, the moving subject thus registered is detected. When the color information of the moving subject is registered beforehand, it is not required to perform the color information obtainment processing in H9, and it is therefore only required to perform the object detection processing in H5.

3-2. Variation

In the second example, if it is determined that the output frame moving operation is performed while the tracking position estimating section 140 is estimating the tracking positions in the background, a priority may be given to the output frame moving operation over the ongoing estimation of the tracking position. That is, in estimating the tracking positions, a priority may be given to the position of the manually moved output frame rather than the position of the output frame that is updated based on the automatically estimated tracking positions.

In this case, if it is determined that the output frame moving operation is completed, update of the output frame is resumed when the estimated tracking positions are included in the moved output frame. This configuration enables the user who finds that the tracking target is incorrect to move the output frame to the position of a correct target so as to allow the device to estimate the tracking positions. As a result, semi-automatic tracking of the target is achieved.

4. Third Example

When the target is lost so that update of the output frame is suspended, the all-area search is performed in the target frame image so that the tracking is continued. However, even with the all-area search, an object different from the target may sometimes be wrongly tracked. In such cases, the tracking positions may remain outside of the output frame. Even when the tracking positions enter the output frame, the wrong target may continue to be tracked. Except for a case in which the original motion picture is input in real time and the real-time output thereof is required, the tracking processing can be performed also after the original motion picture is captured and stored. Therefore, the tracking positions may be re-estimated as follows instead of the all-area search.

For example, suppose that, when a lost occurs due to occlusion as described above and thereafter the occlusion is eliminated and the target reappears in the screen, the user performs the output frame moving operation to move the output frame so that the target is included therein (H1 in FIG. 14, Yes). In this case, the processing of H5 to H13 in FIG. 14 is performed at the time of completion of the output frame moving operation (H3 in FIG. 14, Yes), in which the tracking positions are re-estimated based on the color information obtained in the color information obtainment processing in H9 in FIG. 14 going back in time from the time the target is specified as a result of the output frame moving operation. Then, based on the re-estimated tracking positions, the position of the output frame in a period of time from the occurrence of the lost to the specification of the target by the user is complementally estimated.

In this case, it is highly probable that the tracking positions that are re-estimated going forward in time and the tracking positions that are re-estimated going back in time converge to close areas around the frame image where the lost occurs. In contrast, when the tracking positions are re-estimated by the above-described all-area search, an area that is at a distance from the target but that has a similar color may sometimes be erroneously recognized as the target since the scope of the re-estimation of the tracking positions is the entire area of the target frame image. Therefore, the above-described processing can improve the accuracy of tracking compared to the re-estimation of the tracking positions by the all-area search.

5. Other Embodiments

The embodiments of the present invention are not limited to the above-described embodiments, and changes can be suitably made without departing from the spirit of the present invention. Hereinafter, other embodiments will be described.

5-1. Electronic Devices

The image processing device 1 of the present invention is applicable to a variety of electronic devices such as smartphones, cameras, digital cameras, tablet terminals, PDAs and personal computers.

5-2. Original Motion Picture

The target tracking processing described in the above embodiment may be performed on a stored original motion picture that was previously captured or on an original motion picture that is captured in real time. For example, the target tracking processing can be performed on a motion picture of a soccer game that is captured by a fixed camera with a player of interest as the target, and a lock-on motion picture thus generated that addresses the player of interest can be broadcasted.

A composite motion picture that is obtained by compositing motion pictures captured by a plurality of cameras can be used as an original motion picture of the target tracking processing.

A motion picture that is captured through a fisheye lens can be used as an original motion picture of the target tracking processing. While the distortion of a motion picture captured through a fisheye lens gets stronger toward the edge of the picture, the technique of the present invention can eliminate most of the influence of the distortion since the target is tracked based on the color information thereof.

A motion picture that is captured by a camera that is not the smartphone 2 can be sent to the smartphone 2, and the smartphone 2 may be configured to perform the target tracking processing on the received motion picture as an original motion picture. In this case, the user can view the original motion picture captured by the camera not on the smartphone, perform the above-described output frame moving operation and the like, and check a lock-on motion picture that addresses a target on the smartphone. When lost occurs, the screen may be switched from the lock-on motion picture to the original motion picture.

A camera may be configured to perform the target tracking processing on an original motion picture that is captured by another camera, and to display the original motion picture or a lock-on motion picture on a display section of the camera. In this case, the user can view the original motion picture on the camera, then perform the above-described output frame moving operation and the like and check the lock-on motion picture that addresses a target on the camera. Further, the data of the output frame may be encoded and stored along with the data of the original motion picture and the lock-on motion picture, and the encoded data may be sent to and decoded in an external device. This enables the user to check the original motion picture and the lock-on motion picture on the external device. It is described in the above embodiment section that a motion pictures captured from a fixed point is a suitable material for tracking a target. However, the camera that captures the motion picture may not be fixed but movable. For example, the camera may be moved so that the position of the output frame in an image frame does not come to the edge of the image frame.

5-3. Tracking Areas

In the above-described embodiment, two tracking areas are set on a target in order to track it. However, it is merely an example. Only a single tracking area may be set on a target, or three or more tracking areas may be set on a target.

For example, when a single tracking area is set on a target, a tracking position with reference to the set single tracking area may be estimated. In this case, the determination of the adequacy of the estimated tracking position estimated in the tracking position estimation processing may be made on the basis of whether the calculated reliability of the estimated tracking position satisfies the high reliability condition.

In the above description, a pair of tracking areas, which is the two tracking areas of the first and second tracking areas, is set on a same tracking target. However, plural pairs of tracking areas may be set on the same tracking target. That is, after the pair of tracking areas, which is the two tracking areas of the first and second tracking areas, is set, the user may further set another pair of tracking areas, which are third and fourth tracking areas, in the frame image. Similarly, the user can set yet another pair of tracking areas that is a combination of different tracking areas. In this way, it is possible to set plural pairs of tracking areas. Alternatively, after the first pair of tracking areas, which is the two tracking areas of the first and second tracking areas, is set, the tracking area setting section 11 may automatically set another pair of tracking areas different from the first pair based on the color information of the neighboring area of the first pair of the tracking areas. When the tracking based on the first pair of tracking areas results in a lost, this configuration enables re-tracking the target based on another pair of tracking areas without setting the tracking areas again. Alternatively, the plural pairs of tracking areas may be tracked, and the reliability of the estimated tracking positions of the tracking areas may be determined in every predetermined period of time. The usage priority of the pairs may be determined based on the reliability, and a pair with higher usage reliability may be automatically selected.

5-4. Color Space

In the above-described embodiment, the pixel values of a frame image are represented by the HSV color space, and color information is obtained based on pixel values in the HSV color space. However, it is merely an example. For example, the pixel values of a frame image may be represented by the YUV color space, and color information may be obtained based on pixel values in the YUV color space. Further, the pixel values of a frame image may be represented by the RGB color space, and color information may be obtained based on pixel values in the RGB color space.

5-5. Display of Tracking Areas Information

In the above-described examples, the colored tracking area frames are overlaid on the lock-on motion picture and the original motion picture so that the user can distinguish the tracking areas. However, it is merely an example, and it is not always necessary to display the tracking area frames. The set tracking areas themselves may be displayed, or icons or the like may be displayed at the positions corresponding to the tracking areas, for example, the centers of the tracking areas.

Alternatively, the colors of the tracking areas (the colors obtained by the color information obtaining section 12) may be presented on the display section 300, for example, at the edge of the lock-on motion picture. This configuration enables the user to easily and immediately understand which colors are used for the tracking. When an unintended color is displayed, the user can find that the specified position was incorrect, and can specify the position again.

The color of the frame lines of the output frames may be changed according to the level of reliability of the estimated tracking positions. For example, a plurality of reliability thresholds may be preset so that the tracking position adequacy determining section 15 can determine the level of reliability. If the tracking position adequacy determining section 15 determines that the reliability of an estimated position is greater than a certain reliability threshold but is not very high, or if it determines that the reliability remains at such a level for a predetermined period of time, it makes a notification that prompts the user to reset a new tracking area that includes a different color. Alternatively, the tracking position adequacy determining section 15 may automatically reset a new tracking area that has a different color and is located around the original tracking area.

5-6. Display of Output Frame

In the above-described examples, the colored output frame is overlaid on the lock-on motion picture or the original motion picture so that the user can understand the output frame. However, it is merely an example, and it is not always necessary to display the output frame. The center point of the output frame or the target that is currently tracked may be displayed instead.

5-7. Recording Medium

In the above-described embodiment, a variety of programs and data related to the image processing are stored in the memory section of the image processing device 1 or in the memory section 800 of the smartphone 2, and the processing section reads and executes the programs to achieve the image processing of the above-described embodiment. The memory sections of the devices may include a recording medium (external storage device) such as a memory card (SD card), a COMPACT FLASH (registered trademark) card, a memory stick, a USB memory, a CD-RW (optical disk) or an MO (magneto-optical disk) in addition to the internal storage device such as a ROM, a flash ROM, a hard disk or a RAM, and the variety of programs and data may be stored in the recording medium.

FIG. 15 illustrates an example of the recording medium.

The smartphone 2 may include a card slot 910 to which a memory card 9 is inserted and a card reader/writer (R/W) 920 to read/write information from/to a memory card 9 inserted in the card slot 910. The card reader/writer 920 writes the programs and data stored in the memory section 800 to the memory card 9 according to a control of the processing section 100. Further, the programs and data stored in the memory card 9 are configured to be readable by external devices (e.g. personal computers) including the smartphone 2 so that a lock-on motion picture as described in the above-described embodiment can be generated in the external devices.

REFERENCE SIGNS LIST

1 Image processing device
2 Smartphone
9 Memory card
10 Original motion picture obtaining section
11 Tracking area setting section
12 Color information obtaining section
13 Pattern information obtaining section
14 Tracking position estimating section
15 Tracking position adequacy determining section
16 Tracking position re-estimating section
17 Output frame setting section
18 Lock-on motion picture generating section
20 Original motion picture memory
100 Processing section
200 Operation section
250 Touch panel
300 Display section
400 Sound output section
500 Imaging section
600 Communicating section
700 Clock section
800 Memory section
910 Card slot
920 Card reader/writer

What is claimed is:
1. An image processing device, comprising:
a processor configured to act as:
a tracking area setting unit configured to set a plurality of tracking areas on a target in a frame image of an original motion picture;
a color information obtaining unit configured to obtain color information with respect to each of the plurality of tracking areas set by the tracking area setting unit;
a tracking position estimating unit configured to estimate a plurality of tracking positions with reference to the respective plurality of tracking areas with respect to other frame image of the original motion picture based on the color information of the respective plurality of tracking areas obtained by the color information obtaining unit;

an output frame setting unit configured to set an output frame enclosing the tracking area set by the tracking area setting unit and to update the output frame based on the estimated tracking position;

a motion picture generating unit configured to generate a motion picture that is based on the output frame;

a tracking position adequacy determining unit configured to determine that the tracking positions estimated by the tracking position estimating unit are adequate when distance between the plurality of tracking positions that are estimated by the tracking position estimating unit with reference to the respective plurality of tracking areas set by the tracking area setting unit is equal to or less than a predetermined distance threshold; and a tracking position re-estimating unit configured to re-estimate the tracking position if the tracking position adequacy determining unit determines that the tracking position is inadequate.

2. The image processing device according to claim 1, wherein the output area setting unit is configured to suspend updating the output frame when the tracking position re-estimating unit re-estimates the tracking position.

3. The image processing device according to claim 2, wherein the tracking position estimating unit is configured to estimate the tracking position with respect to the other frame of the original motion picture based on the tracking position re-estimated by the tracking position re-estimating unit; and the output frame setting unit is configured to resume updating the output frame when the tracking position estimated by the tracking position estimating unit is included within a predetermined range based on the output frame.

4. The image processing device according to claim 3, wherein the tracking position estimating unit estimates the plurality of tracking positions with reference to the respective plurality of tracking areas with respect to the other frame image of the original motion picture in a forward order in time, wherein, at the time of the resumption of updating the output frame, the tracking position re-estimating unit is configured to re-estimate the tracking positions with reference to the respective plurality of tracking areas with respect to the other frame image in a reverse order in time from the frame image where the resumption of updating the output frame has occurred to the frame image where the suspension of updating the output frame has occurred.

5. The image processing device according to claim 1, wherein the tracking area setting unit is configured to set a plurality of tracking areas on a plurality of targets in the frame image of the original motion picture; and the image processing device further comprises a priority setting unit configured to set priority of tracking among the plurality of targets; and the output frame setting unit is configured to set an output frame to be updated based on the priority set by the priority setting unit.

6. The image processing device according to claim 1, further comprising:

a pattern information obtaining unit configured to obtain pattern information of the tracking area set by the tracking area setting unit, wherein the tracking area estimating unit is configured to estimate the tracking position with respect to the other frame of the original motion picture further based on the pattern information obtained by the pattern information obtaining unit.

7. The image processing device according to claim 1, further comprising:

an output frame position correcting unit configured to correct a position of the output frame based on a displacement of the position of the output frame updated by the output frame setting unit, wherein the motion picture generating unit is configured to generate the motion picture that is based on the output frame corrected by the output frame position correcting unit.

8. An electronic device, comprising:

the image processing device according to claim 1;

a display unit integrally formed with a touch panel; and a display control unit configured to control the display unit;

wherein the tracking area setting unit is configured to set the tracking area based on a user operation performed on the touch panel, and the display control unit comprises a motion picture display control unit configured to display the motion picture generated by the motion picture generating unit on the display unit.

9. The electronic device according to claim 8, wherein the display control unit comprises a tracking area display control unit configured to overlay the tracking area set by the tracking area setting unit on the motion picture in an identifiable displaying manner.

10. The electronic device according to claim 8, wherein the display control unit comprises a first output frame display control unit configured to overlay the output frame updated by the output frame setting unit on the motion picture in an identifiable displaying manner.

11. The electronic device according to claim 10, wherein the motion picture display control unit is configured to display the motion picture that shows an enlarged predetermined area including the output frame on the display unit, and the first output frame display control unit is configured to overlay the output frame on the motion picture, in which a size of the output frame is adjusted corresponding to the enlarged predetermined area.

12. The electronic device according to claim 8, wherein the display control unit comprises:

an original motion picture display control unit configured to display the original motion picture on the display unit; and a second output frame display control unit configured to overlay the output frame updated by the output frame setting unit on the original motion picture in an identifiable displaying manner.

13. The electronic device according to claim 12, further comprising:

a moving operation determining unit configured to make a determination as to whether a moving operation of moving the output frame currently overlaid on the original motion picture is performed through a user operation on the touch panel; and an object detecting unit configured to detect an object present in the output frame if the moving operation determining unit determines that the moving operation of the output frame is performed, wherein the color information obtaining unit is configured to obtain color information of the object detected by the object detecting unit, and the tracking position estimating unit is configured to set an area of the object detected by the object detecting unit as the tracking area and to estimate the tracking position with respect to the other frame of the original motion picture.

14. An electronic device, comprising:

the image processing device according to claim 1;

a display unit integrally formed with a touch panel; and a display control unit configured to control the display unit, wherein the tracking area setting unit is configured to set a plurality of setting areas on the target in the frame image of the original motion picture based on a user operation performed on a touch panel, the color information obtaining unit is configured to obtain the color information with respect to each of the plurality of tracking areas set by the tracking area setting unit, the tracking position estimating unit is configured to estimate a plurality of tracking positions with reference to the respective plurality of tracking areas with respect to the other frame image of the original motion picture based on the color information of the respective plurality of tracking areas obtained by the color information obtaining unit, and the display control unit comprises a motion picture display control unit configured to display the motion picture generated by the motion picture generating unit on the display unit.

15. The electronic device according to claim 14, wherein the display control unit comprises a tracking area display control unit configured to overlay the plurality of tracking areas set by the tracking area setting unit on the motion picture in such an identifiable displaying manner that distinguishes the plurality of tracking areas from each other.

16. An image processing method, comprising the steps of:

setting a plurality of tracking areas on a target in a frame image of an original motion picture;

obtaining color information with respect to each of the set tracking areas;

estimating a plurality of tracking positions with reference to the respective plurality of tracking areas with respect to other frame image of the original motion picture based on the obtained color information of the respective plurality of tracking areas;

setting an output frame enclosing the set tracking area and updating the output frame based on the estimated tracking position;

generating a motion picture that is based on the output frame;

determining whether the tracking positions are adequate when distance between the plurality of tracking positions with reference to the respective plurality of tracking areas is equal to or less than a predetermined distance threshold; and re-estimating the tracking position if the tracking position is determined to be inadequate.

17. A non-transitory computer readable recording medium storing a program that makes a computer perform image processing comprising:

a tracking area setting step of setting a plurality of tracking areas on a target in a frame image of an original motion picture;

a color information obtaining step of obtaining color information with respect to each of the tracking areas set in the tracking area setting step;

a tracking position estimating step of estimating a plurality of tracking positions with reference to the respective plurality of tracking areas with respect to other frame image of the original motion picture by using the color information of the respective plurality of tracking areas obtained in the color information obtaining step;

an output frame setting step of setting an output frame enclosing the tracking area set in the tracking area setting step and updating the output frame based on the estimated tracking position;

a motion picture generating step of generating a motion picture that is based on the output frame;

an adequate determining step of determining whether the tracking positions are adequate when distance between the plurality of tracking positions with reference to the respective plurality of tracking areas is equal to or less than a predetermined distance threshold; and a re-estimating step of re-estimating the tracking position if the tracking position is determined to be inadequate in the adequate determining step.

* * * * *